United States Patent
Iwasaki

(10) Patent No.: US 11,336,784 B2
(45) Date of Patent: May 17, 2022

(54) INFORMATION PROCESSING APPARATUS AND CONTROL METHOD

(71) Applicant: CANON KABUSHIKI KAISHA, Tokyo (JP)

(72) Inventor: Yukiyasu Iwasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 16/828,809

(22) Filed: Mar. 24, 2020

(65) Prior Publication Data

US 2020/0314254 A1   Oct. 1, 2020

(30) Foreign Application Priority Data

Mar. 29, 2019   (JP) .............................. JP2019-068052

(51) Int. Cl.
  *H04N 1/04*   (2006.01)
  *H04N 1/00*   (2006.01)
  *G06F 3/12*   (2006.01)

(52) U.S. Cl.
  CPC ......... *H04N 1/0057* (2013.01); *G06F 3/1203* (2013.01); *G06F 3/125* (2013.01)

(58) Field of Classification Search
  CPC ...... H04N 1/0057; G06F 3/1203; G06F 3/125
  USPC .............................................. 358/1.12, 498
  See application file for complete search history.

(56) References Cited

U.S. PATENT DOCUMENTS

| | | | |
|---|---|---|---|
| 2007/0024874 A1* | 2/2007 | Kawamura | H04N 1/3935 358/1.2 |
| 2008/0088875 A1* | 4/2008 | Taira | G03G 15/6538 358/1.15 |
| 2010/0123940 A1* | 5/2010 | Kamisuwa | G03G 15/5025 358/452 |
| 2011/0116131 A1* | 5/2011 | Mitsui | G06F 3/1255 358/1.15 |
| 2014/0009787 A1* | 1/2014 | Shiohara | H04N 1/6027 358/1.15 |
| 2014/0036279 A1* | 2/2014 | Tohki | G03G 15/5095 358/1.2 |
| 2018/0091663 A1* | 3/2018 | Tohki | H04N 1/00411 |
| 2019/0126652 A1* | 5/2019 | Kohama | G06F 3/1244 |
| 2020/0133591 A1* | 4/2020 | Kaneda | G06F 3/1257 |
| 2021/0026585 A1* | 1/2021 | Fujita | H04N 1/00411 |

FOREIGN PATENT DOCUMENTS

JP   2015-508921 A   3/2015

* cited by examiner

*Primary Examiner* — Cheukfan Lee
(74) *Attorney, Agent, or Firm* — Canon U.S.A., Inc. I.P. Division

(57) ABSTRACT

A method of controlling an information processing apparatus includes acquiring information on a sheet size specified by a user and acquiring information on a sheet feeding direction to a printing apparatus for sheet corresponding to the specified sheet size. In a case where the sheet feeding direction is a predetermined direction, a predetermined control is executed. After the predetermined control, a drawing application is notified of information on a page setting.

19 Claims, 19 Drawing Sheets

FIG. 13

1300
- A4 — 1301
- Width 21000 — 1302
- Height 29700 — 1303
- feed-direction long-edge — 1304
- view-direction short-edge — 1305

DoublePostcard
Width 14800
Height 20000
feed-direction long-edge
view-direction long-edge Envelope
Width 9800
Height 19000
feed-direction short-edge
view-direction long-edge

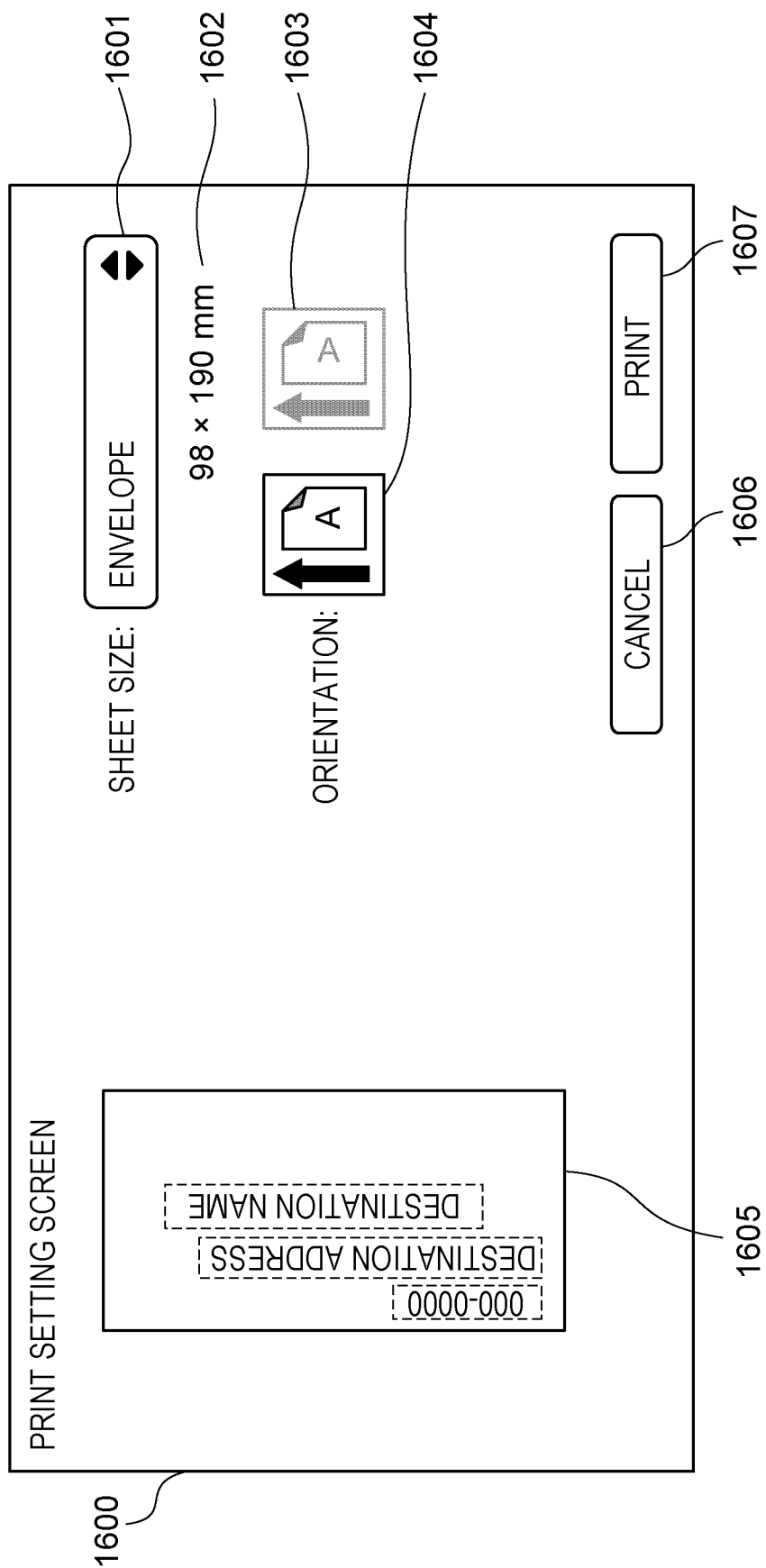

INFORMATION PROCESSING APPARATUS AND CONTROL METHOD

BACKGROUND

Field

The present disclosure relates to an information processing apparatus and a control method, and particularly, to a technique related to print setting control.

Description of the Related Art

In a related technique, an operating system (hereinafter, referred to as an OS) provides a standard print function (hereinafter, referred to as an OS standard print function) which works without printer-specific software provided by a printer vendor (hereinafter, referred to as a printer driver) (PCT Japanese Translation Patent Publication No. 2015-508921). The OS makes a determination based on information acquired from the printer as to whether the printer supports the OS standard print function. In a case where it is determined that the OS standard print function is supported, the OS transmits print data generated by the OS standard print function to the printer.

SUMMARY

According to an aspect of the present disclosure, a method of controlling an information processing apparatus includes acquiring information on a sheet size specified by a user, acquiring information on a sheet feeding direction to a printing apparatus for sheet corresponding to the specified sheet size, executing, in a case where the sheet feeding direction is a predetermined direction, a predetermined control, and, after the predetermined control, notifying, via a notification, a drawing application of information on a page setting.

Further features of the present disclosure will become apparent from the following description of exemplary embodiments with reference to the attached drawings.

BRIEF DESCRIPTION OF THE DRAWINGS

FIG. 13 is a diagram illustrating sheet size information supported by a printer, wherein the information includes view direction information.

FIG. 16 is a diagram illustrating a print setting screen displayed when a sheet size is selected which is to be fed in a short-edge direction.

DESCRIPTION OF THE EMBODIMENTS

Some functions provided by the OS standard print functions may be different from functions provided by the printer driver. Therefore, a user accustomed to the environment provided by the conventional printer driver may be confused by a different operation under the environment provided by the OS standard print function.

In view of the above, the present disclosure provides a technique for improving operability in the environment of the OS standard print function.

Embodiments of the present disclosure are described in detail below with reference to the accompanying drawings. Note that these embodiments are described by way of example only and not limitation. Also note that all features described in embodiments are not necessarily needed to practice the present disclosure.

First Embodiment

System Configuration

Figure 1A:
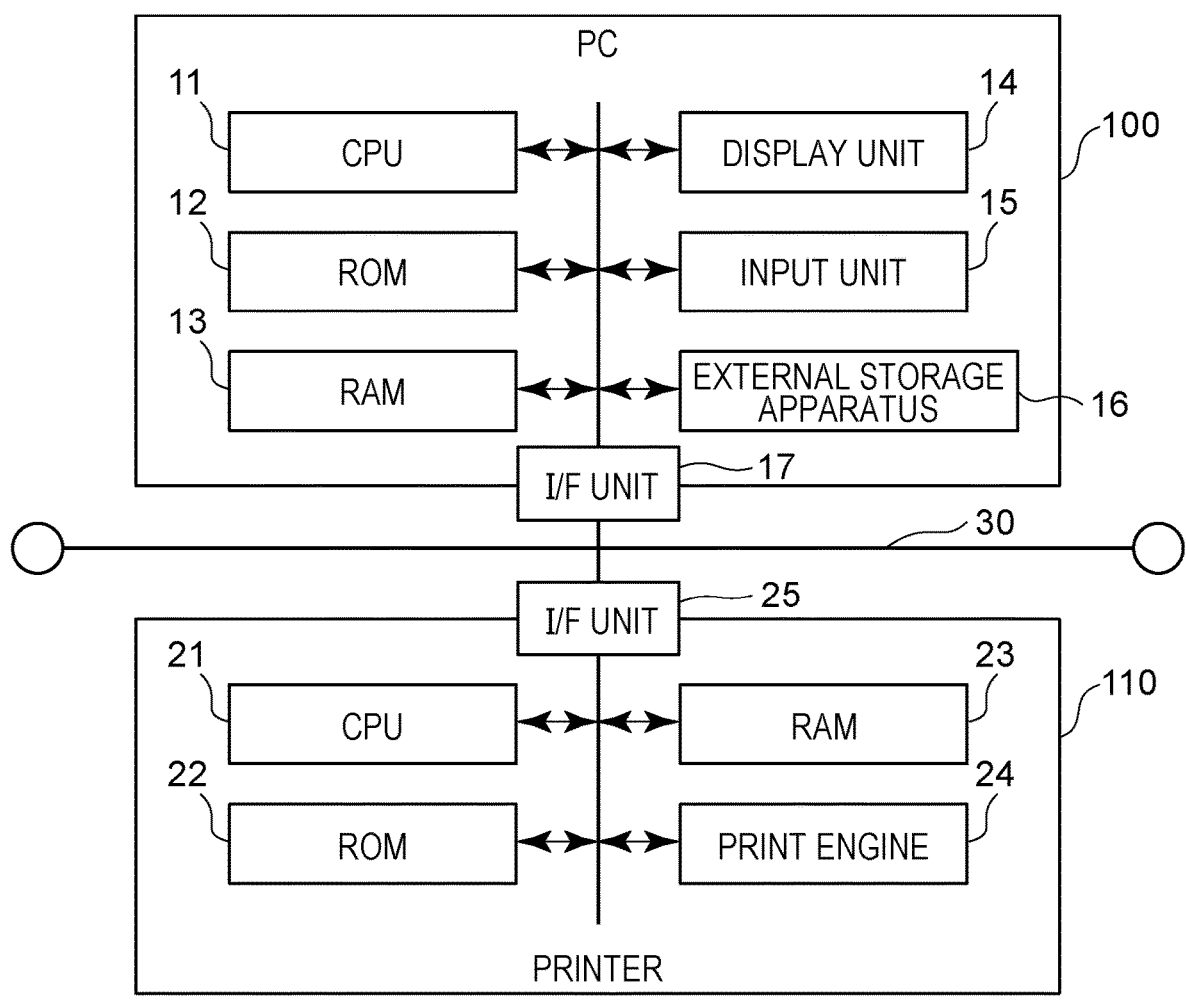
FIGS. 1A and 1B are diagrams illustrating an overall configuration of a printing system according to an embodiment.

An overall configuration of a printing system according to a first embodiment is described below with reference to FIGS. 1A and 1B. FIG. 1A is a block diagram illustrating a hardware configuration of the printing system according to the present embodiment. In the present embodiment, an example of a printing system is explained in which a PC 100 functioning as a host computer and a printer 110 are capable of communicating with each other via a communication bus 30 (network) such as a LAN (Local Area Network). In this example, by way of example, the LAN is used as the network, but a WAN (Wide Area Network) may be used. The network may be connected either by wire or wirelessly, or by a mixture thereof. The PC 100 and the printer 110 may be connected using a USB (Universal Serial Bus). Although only one printer is shown in FIG. 1A, an arbitrary number of printers may be connected via the communication bus 30.

The PC 100 is an example of an information processing apparatus. An operating system (hereinafter, referred to as an OS) is installed in the PC 100. In the present embodiment, it is assumed by way of example that macOS is installed as the OS. The OS includes an OS standard print control unit 103 realized by OS standard print software described later.

The PC 100 is, for example, a personal computer (PC), and includes an interface (I/F) unit 17, a CPU 11, a ROM 12, a RAM 13, a display unit 14, an input unit 15, and an external storage apparatus 16. In the present embodiment, the PC 100 is not limited to a desktop PC, but the PC 100 may be a portable terminal such as a notebook PC, a tablet PC, and a smartphone.

The PC 100 transmits an instruction for controlling the printer 110, print data, a setting command, and the like to the printer 110. The CPU 11 is a central processing unit that controls various units of the PC 100, and executes a control program such as the OS. A system operation is controlled by the OS stored in the ROM 12. The RAM 13 is a random access memory in which a work area used by the CPU 11 is provided. The external storage apparatus 16 stores various control programs such as a drawing application.

The input unit 15 is an input device such as a keyboard and a mouse for operating the PC 100. The display unit 14 is a display device for displaying information for confirming information input via the input unit 15, or displaying a user interface screen of the OS or an application, displaying a message, and the like. The I/F unit 17 is a communication module configured to transmit and receive data to and from the printer 110.

The printer 110 functioning as a printing apparatus is, for example, an ink jet printer. The printer 110 includes an I/F unit 25, a CPU 21, a ROM 22, a RAM 23, and a print engine 24. The CPU 21 is a central processing unit that controls various units described below. The ROM 22 is a read-only memory and stores a program for controlling the print engine 24. The RAM 23 is a random access memory, and temporarily stores a program necessary for the operation of the print engine 24, setting values received from the PC 100, and the like.

The print engine 24 prints on a recording medium based on print data sent from the PC 100. The I/F unit 25 is a communication module that receives print data from the PC 100, and has a function of transmitting current status information of the printer 110 from the printer 110 to the PC 100. The status information refers to status data indicating the status of the printer 110 that is returned by the printer 110 in response to a request from the PC 100 connected via the I/F unit 25. The status data is information indicating an operation state of the printer 110 such as "printing" or "standby state", and an error state of the printer 110 such as "out of sheet", "cover is open", and "no ink remaining".

Figure 1B:
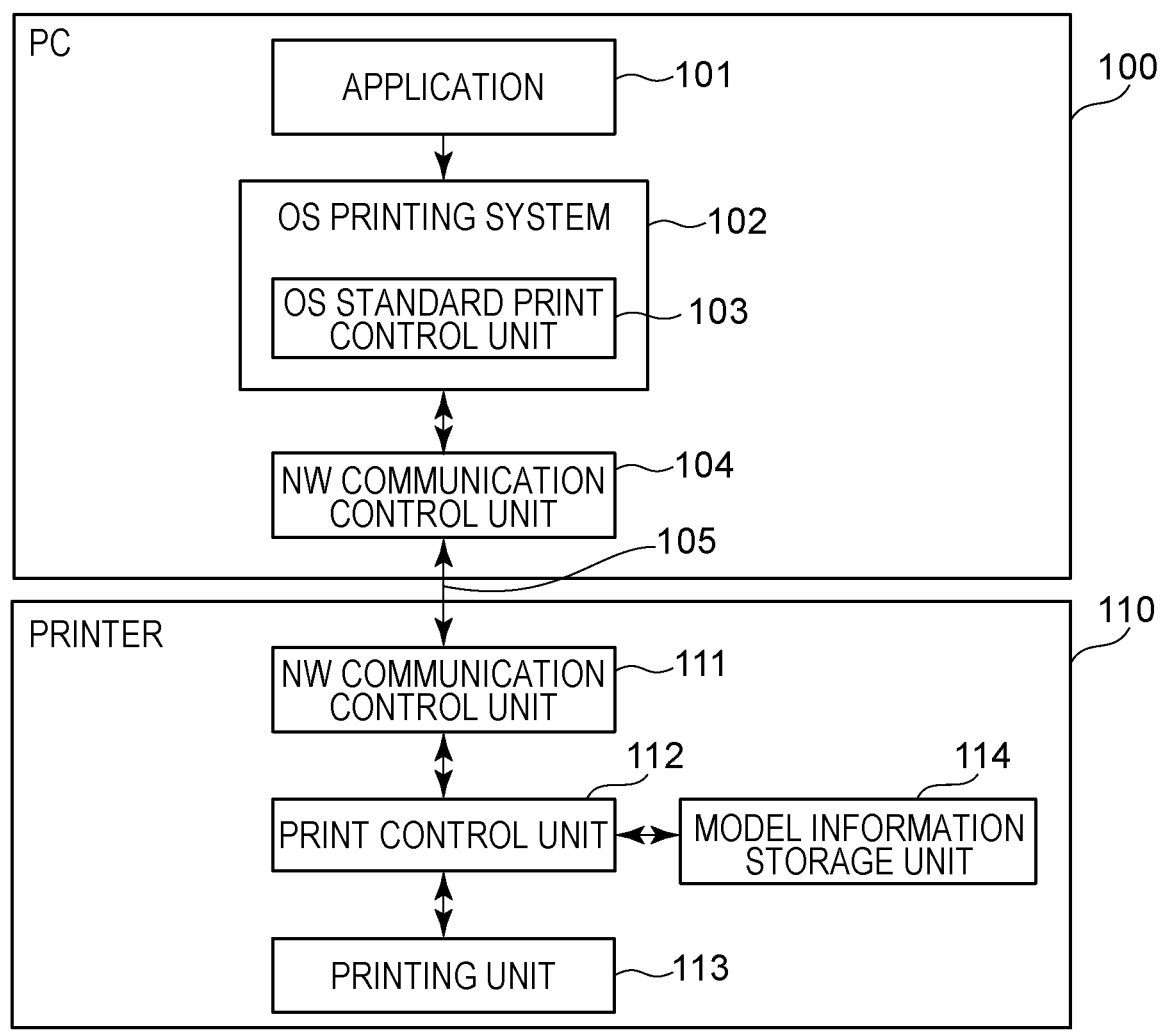

FIG. 1B is a block diagram illustrating a software configuration of the printing system according to the present embodiment. First, the software configuration of the PC 100 is described below. The PC 100 includes a drawing application 101, an OS printing system 102, and a network (NW) communication control unit 104. The OS printing system 102 includes an OS standard print control unit 103.

The drawing application 101 is software that generates drawing data based on an instruction issued by a user. The application refers to software that is operable on the OS which basic software of the PC 100. The drawing application 101 includes, for example, word processing software for generating documents, image editing software, New Year's card generation software, or the like. The drawing data generated by the drawing application 101 is expressed in a data format such as a PDF (Portable Document Format) format.

The OS printing system 102 is an OS element that controls printing. The OS printing system 102 sequentially processes print requests as jobs provided from the drawing application 101. The OS standard print control unit 103 included in the OS printing system 102 is software having a standard print function (an OS standard print function) necessary for generating print data. The OS standard print control unit 103 performs a spool process on the drawing data generated by the drawing application 101 and generates print data in a predetermined format (hereinafter, also referred to as a "standard format"). The OS standard print control unit 103 then performs a process of outputting the standard format print data to the NW communication control unit 104 in order to transmit the generated standard format print data to the printer 110. In the present embodiment, the OS standard print control unit 103 communicates with the printer 110 via the NW communication control unit 104 using IPP (Internet Printing Protocol) which is a standard print protocol. Furthermore, the OS standard print control unit 103 acquires identification information such as model information of the printer 110 via the NW communication control unit 104 to determine whether the printer 110 supports the OS standard print function. Note that the information acquired to determine whether the OS standard print function is supported is not limited to the model information of the printer 110, but capability information of the printer 110 or the like may be acquired.

A processing flow related to a print instruction is briefly described below. After generating the drawing data, the drawing application 101 issues a print request to the OS printing system 102 based on an instruction issued by a user. The print request is input as a print job to the OS printing system 102. When the print request is issued, the print setting may be received from the user via a setting screen provided by the OS standard print control unit 103.

When the print request is issued, a print job including information on print settings and drawing data generated by the drawing application 101 is transferred from the drawing application 101 to the OS printing system 102. The information on the print settings includes information such as a sheet size, a sheet type, and a print queue in which printing is to be performed.

Upon receiving a print job, the OS standard print control unit 103 in the OS printing system 102 generates print data in a predetermined format according to the OS standard print function. The OS printing system 102 transmits the generated print data to the printer 110 via the NW communication control unit 104.

Next, a software configuration of the printer 110 is described below. The printer 110 includes an NW communication control unit 111, a print control unit 112, a printing unit 113, and a model information storage unit 114.

The print control unit 112 receives print data from the PC 100 via the NW communication control unit 111, and execution printing by controlling the printing unit 113 based on the print data.

Figure 2:
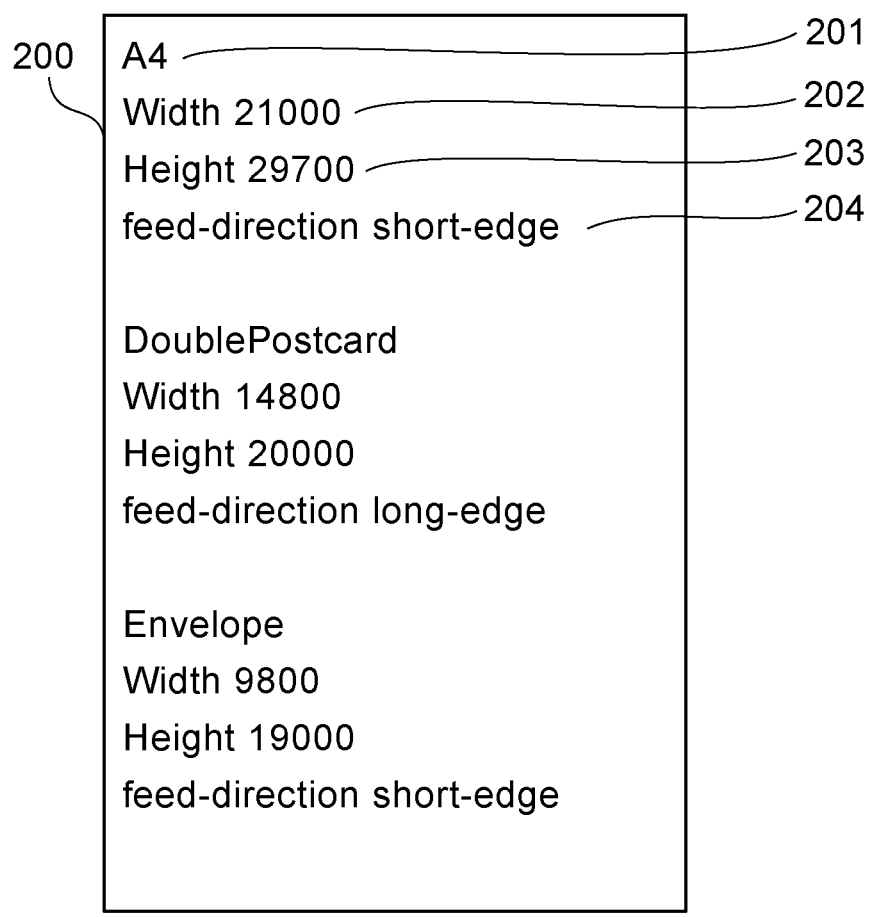
FIG. 2 is a diagram illustrating sheet size information supported by a printer.

The model information storage unit 114 stores sheet-related information for each of a plurality of sheet sizes supported by the printer 110. As shown in FIG. 2, the sheet-related information includes information on a sheet size and information on a sheet feeding direction.

The print control unit 112 receives the information on the sheet size from the model information storage unit 114, and transmits information on the sheet feeding direction and information on the sheet size to be set in the OS printing system 102 to the PC 100 via the NW communication control unit 111.

Next, the sheet feeding direction of the printer 110 is described. In the present embodiment, it is assumed that the printer 110 is provided with a manual sheet feeder, and supports sheet sizes of an A4, a double postcard, and an envelope size. The printer 110 according to the present embodiment is designed to feed the A4 size and the envelope size in a direction in which the long side of sheet is parallel to the feeding direction (hereinafter, referred to as a long-edge direction). On the other hand, a double postcard is specified to be fed in a direction in which the short side of the postcard is parallel to the feeding direction (hereinafter, referred to as a short-edge direction).

In the related technique, the printer driver displays the print setting screen and the edit screen such that the page is displayed in the landscape orientation so as to be consistent with a sheet ejection direction even for sheet sizes which are to be fed in the long-edge direction.

FIG. 2 is a diagram illustrating a list of sheet-related information including information on sheet sizes supported by the printer 110. In the example shown in FIG. 2, it is assumed that three sheet sizes, that is, an A4 size, a double postcard size, and an envelope size are supported by the printer 110. The sheet-related information includes a sheet name 201, a sheet width 202, and a sheet height 203 of each sheet size supported by the printer 110, as well as a sheet feeding direction 204.

The relationship between the OS standard print function and the sheet feeding direction is described below. In some OS standard print functions, the page orientation is always handled in the portrait orientation. This is because the sheet size information defined by a specific protocol (Internet Printing Protocol) is used regardless of the sheet feeding direction in the printer. For this reason, in the OS standard print function, a double postcard or a western envelope size that is generally edited in a landscape orientation (in generation of a letter content) is also handled in a portrait direction. In the OS, the portrait orientation is specified as the default page setting orientation.

In the specifications of the OS standard print control unit 103 according to the present embodiment, it is necessary to describe sheet sizes in a manner allowable in the OS standard print function. In this case, for any of the sheet sizes, the value of the sheet height 203 is not smaller than the value of the sheet width 202 (that is, the value of the height is greater than or equal to the value of the width). In the sheet feeding direction 204, "short-edge" is set for sheet sizes which are to be fed in the short-edge direction, and "long-edge" is set for sheet sizes which are to be fed in the long-edge direction.

In FIG. 2, registration for the double postcard, the width, the height, and the sheet feeding direction are respectively specified as 148 mm, 200 mm, and long-edge. That is, in the registration of the double postcard, the sheet size defined as the portrait and the sheet feeding direction is defined as long-edge direction.

Therefore, when a user selects a double postcard of a type supposed to be written (edited) in the landscape orientation content, it is difficult to write the content in the edit screen in the default page orientation. Furthermore, a page is displayed in an improper orientation on the preview screen, and thus, a desired print result may not be obtained. Therefore, in order to provide an appropriate view, the user may perform an operation to change the page orientation from "portrait" to "landscape". This operation is not necessary in the conventional printer driver, and thus this operation results in a reduction in the operability for the user. The above situation is discussed in further detail below taking a preview screen as an example.

Figure 3:
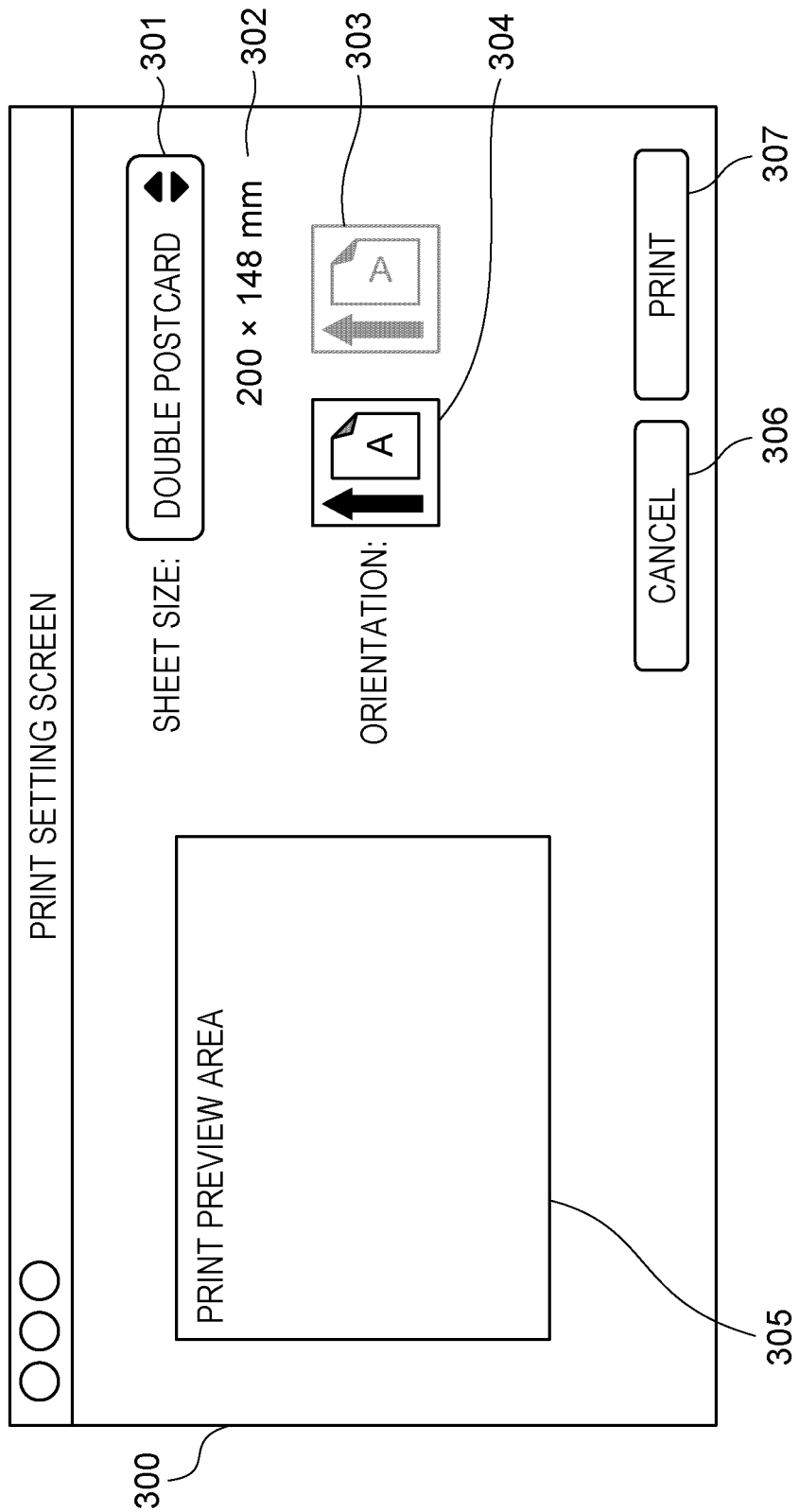
FIG. 3 is a diagram illustrating a print setting screen displayed by a printer driver when a sheet size to be fed a long-edge direction is selected.

FIG. 3 is a schematic diagram showing a print setting screen 300 in a conventional printer driver. The print setting screen 300 provided by the printer driver includes a sheet size selection item 301, a sheet size display area 302, and furthermore, as page orientation selection items, portrait 304 (a vertically long orientation) and landscape 303 (a horizontally long orientation). The print setting screen 300 further includes a cancel button 306 and a print button 307. Although not shown in FIG. 3, the print setting screen 300 also includes a printer selection item for selecting a printer to execute printing.

In FIG. 3, in the sheet size selection item 301, "double postcard" is selected as the sheet size which is to be fed in the long-edge direction. As the page orientation, portrait 304, which is the default page orientation, is specified. The printer driver determines the sheet height value and the sheet width value of the sheet size in the page setting depending on the sheet feeding direction specified for the sheet size. Therefore, as for a sheet size to be fed in the long-edge direction as is the case for the double postcard, the value of the sheet width is greater than the value of the sheet height in the page setting. More specifically, in FIG. 3, it is indicated in the sheet size display area that the width is 200 mm and the height is 148 mm. In a case where a sheet size which is to be fed in the long-edge direction is specified, an image indicating a print result is displayed in the landscape orientation in the print preview area 305 (a print preview image based on drawing data). When the user selects the print button 307 after confirming the print preview, a print request is issued.

As described above, in the case of the print setting screen provided by the printer driver, the user can check the landscape print preview while keeping the page orientation in the default page orientation, that is, in the portrait orientation. Note that when the page orientation is changed to landscape 303 in FIG. 3, the print preview is displayed in the portrait orientation in the print preview area 305.

Figure 4:
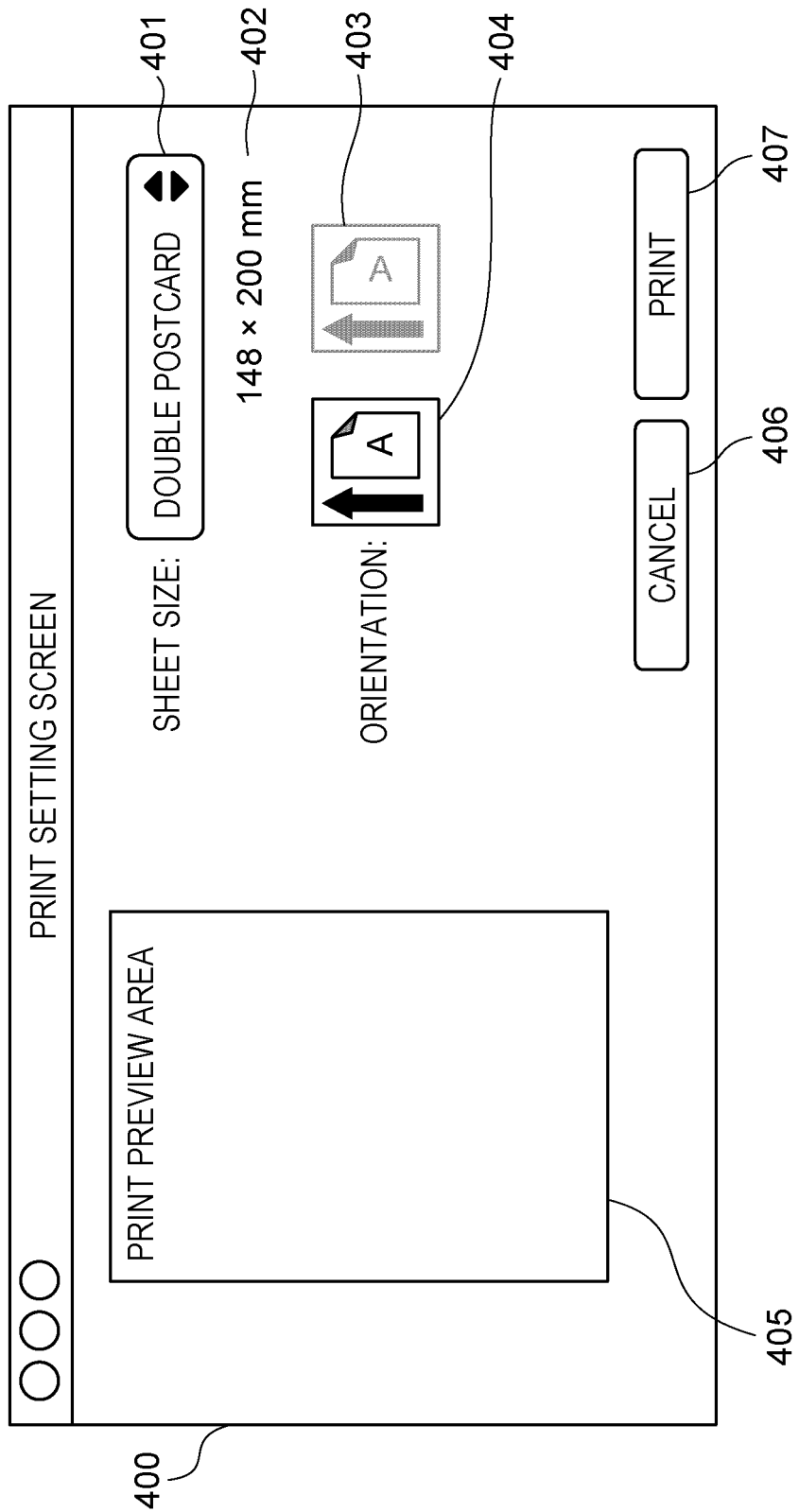
FIG. 4 is a diagram illustrating a print setting screen displayed by an OS standard print function when a sheet size to be fed in long-edge direction is selected.

Next, a print setting screen 400 provided by the OS standard print function of the OS printing system 102 is described. FIG. 4 is a schematic diagram showing the print setting screen 400 provided by the OS standard print function. In FIG. 4, the print setting screen 400 includes a sheet size selection item 401, a sheet size display area 402, and, furthermore, as page orientation selection items, portrait 404 (a vertically long orientation) and a landscape 403 (a horizontally long orientation). Furthermore, the print setting screen 400 includes a print preview area 405, a cancel button 406, and a print button 407. Although not shown in FIG. 4, the print setting screen 400 also includes a printer selection item for selecting a printer to execute printing.

In FIG. 4, in the sheet size selection item 401, "double postcard" is selected as the sheet size which is to be fed in the long-edge direction. As the page orientation, portrait 404, which is the default page orientation, is specified. In the specification of the OS standard print function, it is stipulated that the sheet height is not smaller than the sheet width regardless of the sheet feeding direction. In fact, in the list of sheet-related information in FIG. 2, the sheet size of "double postcard" is registered such that the width is 148 mm and the height is 200 mm. That is, the double postcard is registered as a sheet size in the portrait orientation. Therefore, in a case where a "double postcard" that is to be fed in the long-edge direction is selected, a print preview image is displayed in the portrait orientation in the print preview area 405 as with sheet sizes that are to be fed in the short-edge direction.

However, it is difficult for a user to check the print preview of the double postcard displayed in the portrait orientation. Thus, the user needs to change the page orientation to landscape 403 in order to view the print preview image in the landscape orientation as shown in FIG. 3. Thus, it is necessary to perform an operation which is not necessary when the printer driver is used, which results in a result in the operability.

Figure 5:
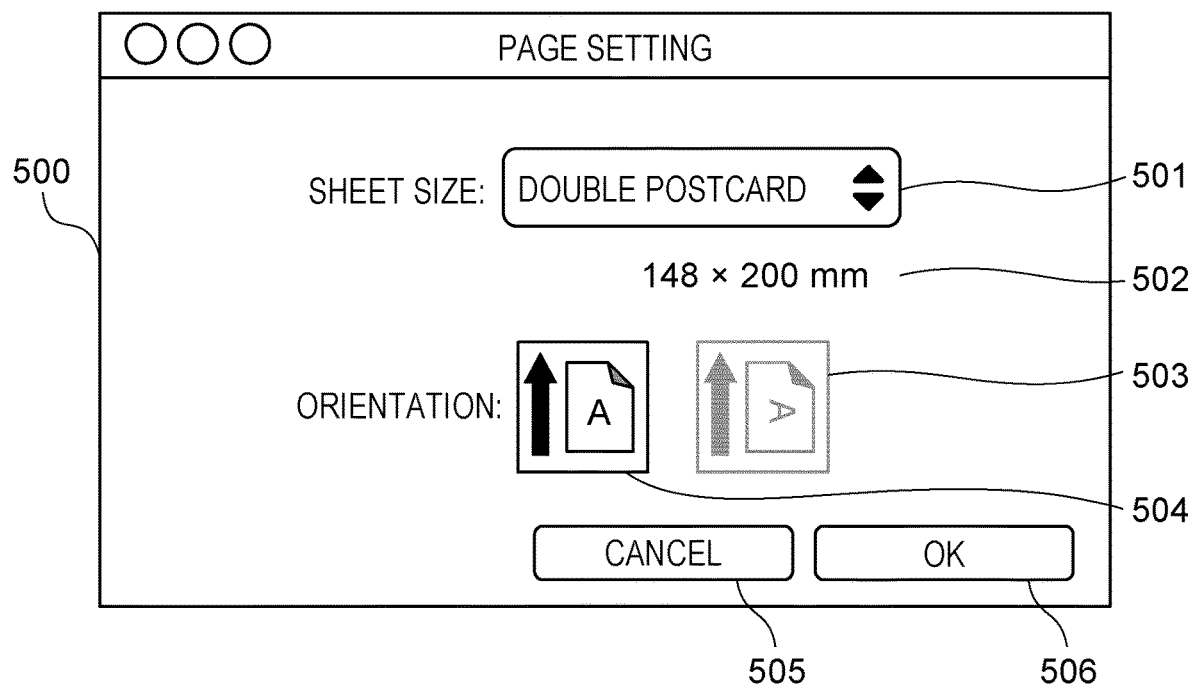
FIG. 5 is a diagram illustrating a sheet orientation setting screen for use when a sheet size is selected.

Next, a page setting screen and an edit screen used by a user to generate drawing data using the drawing application 101 are described below with reference to FIG. 5 and FIGS. 6A, 6B, and 6C. FIG. 5 is a schematic diagram showing a page setting screen 500 which is displayed in response to an instruction issued by a user after the drawing application is started. The page setting screen 500 is provided by the OS printing system 102 in response to a call from the drawing application 101. The page setting screen 500 includes a sheet size selection item 501, a sheet size display area 502, and page orientation selection items portrait 504 (a vertically long orientation) and landscape 503 (a horizontally long direction). The page setting screen 500 further includes a cancel button 505 and an OK button 506. Although not shown in FIG. 5, the page setting screen 500 also includes a printer selection item for selecting a printer to execute printing.

In some cases, a printer and the OS standard print function are linked and registered in the PC 100, but in other cases, a printer driver is linked with a printer. For example, depending on the printer, a printer driver provided by a printer vendor is installed in the PC 100, and the printer and the printer driver are linked. On the other hand, in the case of a printer that supports the OS standard print function, when it is determined that the printer supports the OS standard print function based on model information acquired from the printer when the printer is registered, the printer is registered as using the OS standard print function. Even in a case where a printer supports the OS standard print function, a printer driver for this printer may be available. In this case, a user may select, in registration, whether to link the printer with the OS standard print function or the printer driver. However, in any case, when the printer is registered, the OS standard print function or the printer driver is linked to the printer. Therefore, when a printer is selected on the page setting screen 500 in FIG. 5, it is determined whether the OS standard print function or the printer driver is used depending on the selected printer.

In the page setting screen in FIG. 5, "double postcard" is selected as the sheet size, and "portrait" is specified by default as the page orientation. In this page setting state, if the OK button 506 is selected, an edit screen provided by the drawing application 101 is displayed, for example, as shown in FIGS. 6A, 6B, and 6C.

Figure 6A:
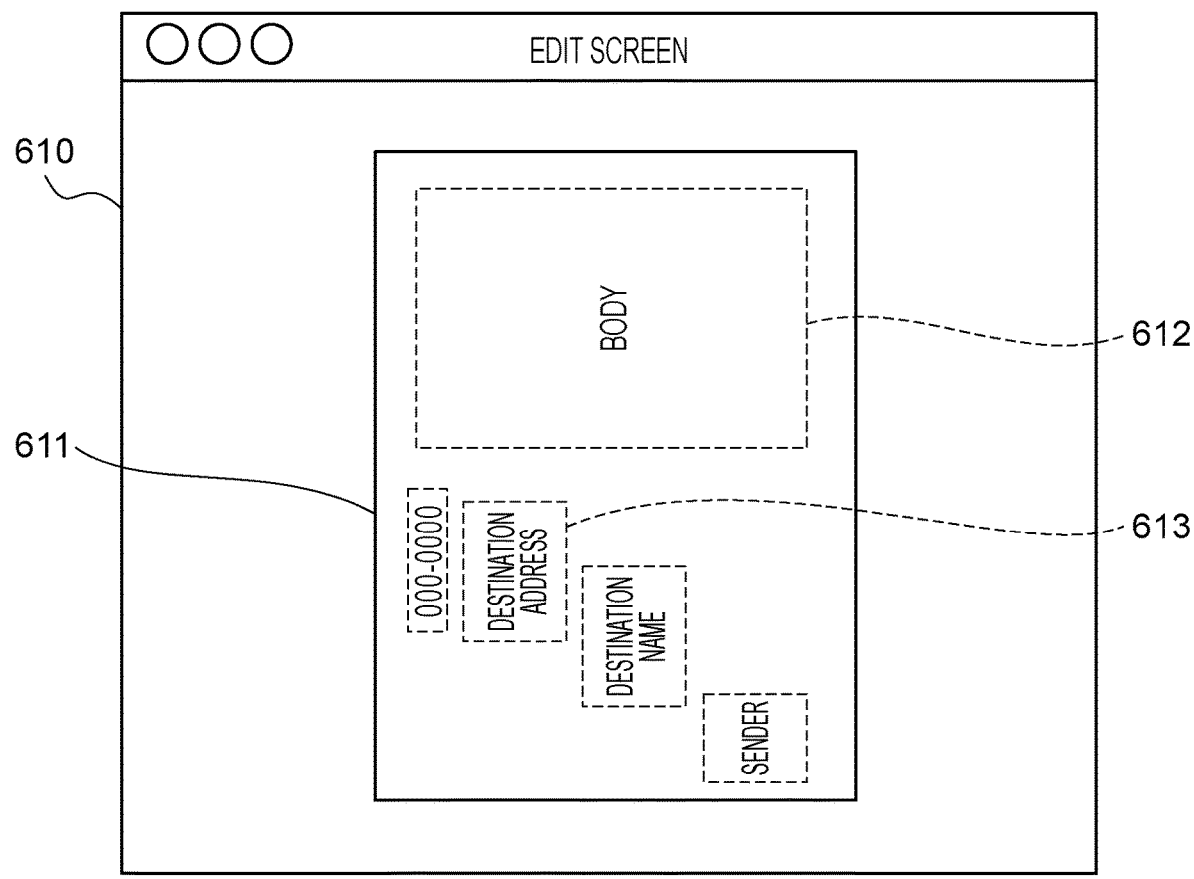
FIGS. 6A, 6B, and 6C each are a diagram illustrating a document generation screen for use when a sheet size which is to be fed in the long-edge direction is selected.
Figure 6B:
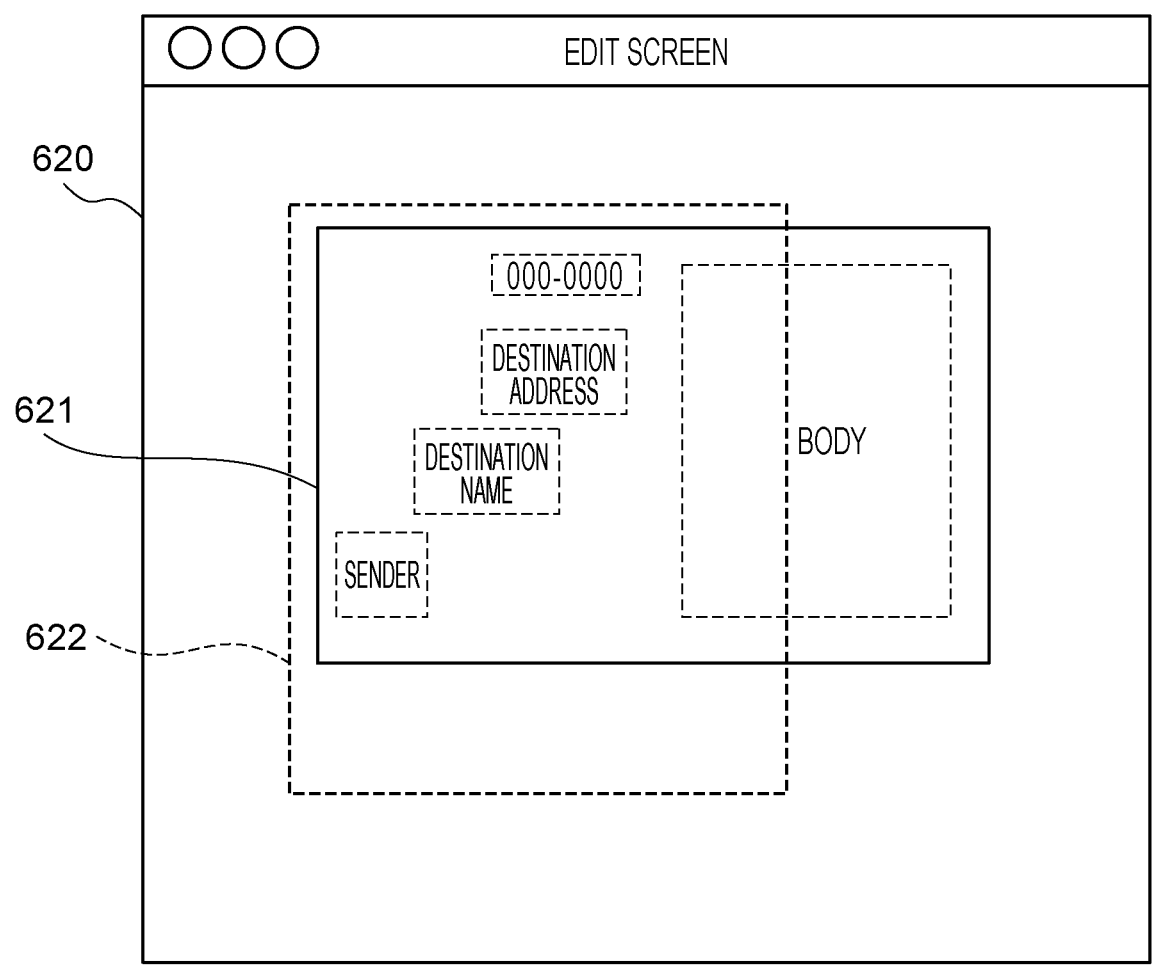
Figure 6C:
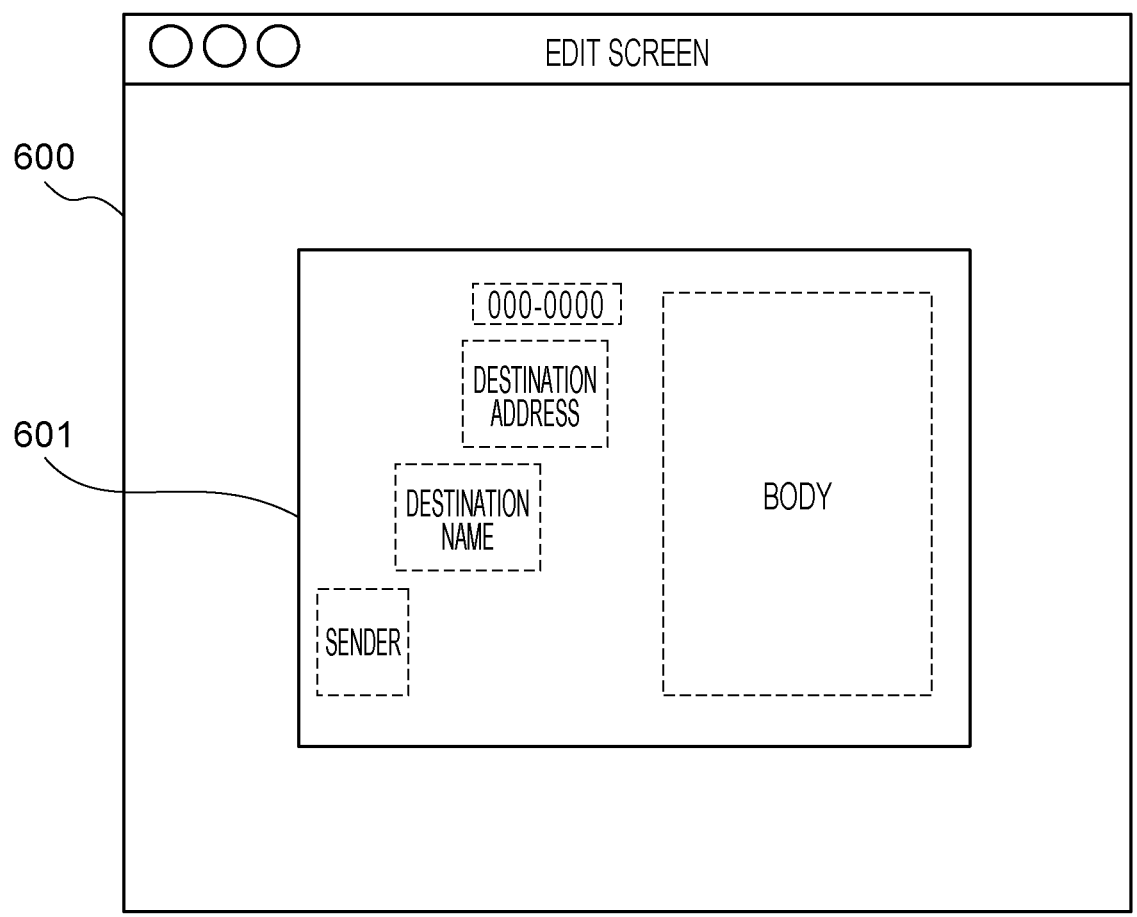

FIGS. 6A, 6B, and 6C each are a diagram illustrating an edit screen provided by the drawing application 101. On the edit screen, drawing data is displayed within a page, which is a print area, based on the sheet size and page orientation set on the page setting screen in FIG. 5.

FIG. 6A shows the edit screen for a case where the control according to the present embodiment is not performed. In this case, the sheet size is set to "double postcard" and the page orientation is set to portrait 504 which is the default page orientation on the page setting screen in FIG. 5. In this example, the page indicated in the print area 611 on an edit screen 610 is displayed in the portrait orientation. Therefore, when editing is performed on a sheet size, such as a double postcard, in which characters are described on sheet in the landscape orientation, objects such as the text 612 or the text 613 are displayed in directions rotated by 90 degrees counterclockwise, which causes a reduction in operability.

In order to change the orientation of the page to landscape, the user needs to change the page orientation to landscape 503 on the page setting screen in FIG. 5.

FIG. 6B shows an edit screen 620 displayed when a drawing application (for example, a postcard generation application) is of a type different from the drawing application in FIG. 6A. Also in this case, it is assumed that "double postcard" is selected as the sheet size by a user, and the page orientation is set to portrait which is the default orientation. In FIG. 6B, the page area 621 is displayed in the landscape orientation according to the specifications of the drawing application. However, since the page orientation is set to portrait by default, an area indicated in the print area 622 is to be printed. Therefore, as a result, only a region where the page area 621 and the print area 622 overlap is printed as a printed matter. Therefore, also in the case shown in FIG. 6B, it is necessary to change the page orientation to landscape.

By changing the page orientation to landscape, the page is displayed in the landscape orientation as shown in FIG. 6C. However, in the page setting under the conventional printer driver environment, the page is displayed in the landscape orientation on the edit screen as shown in FIG. 6C while keeping the page orientation in the default orientation of portrait 504 without needing to change to landscape 503). That is, in the environment where the OS standard print function is used, a user needs to perform an operation that is not necessary when using the printer driver, and thus a reduction in operability occurs.

In view of the above, in the present embodiment, when a print request using the OS standard print function is issued, if the sheet feeding direction is the long-edge direction, a process is performed to exchange the width value and the height value of the sheet size. The control according to the present embodiment is described in detail below.

Figure 7:
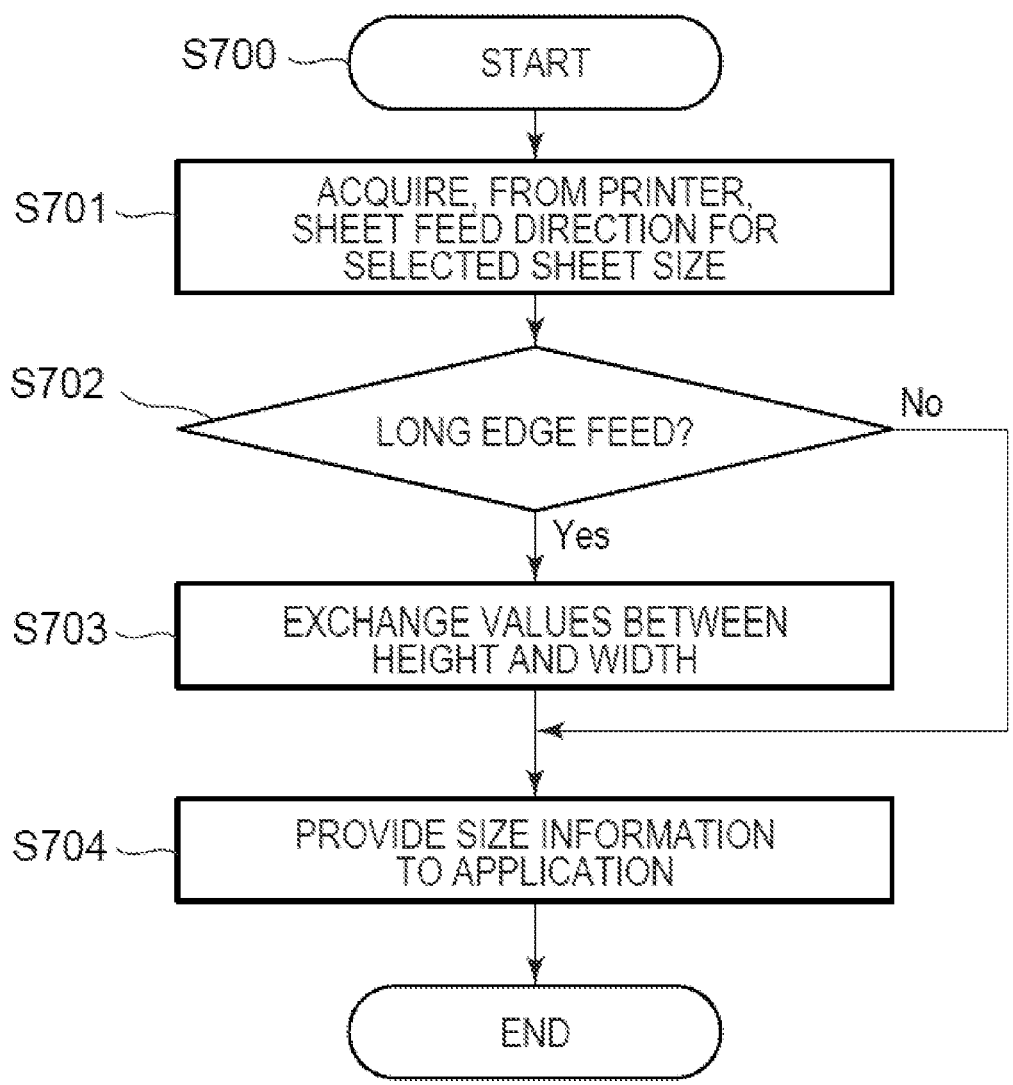
FIG. 7 is a flowchart illustrating a process of notifying an application of a sheet size in an OS standard print function.

FIG. 7 is a flowchart illustrating a process executed by the OS printing system 102. More specifically, FIG. 7 shows a processing flow in which the OS standard print control unit 103 in the OS printing system 102 notifies the drawing application 101 of the sheet size. In the following description, the OS standard print control unit 103 is a processing entity that performs various processes. However, in practice, functions corresponding to the respective processes are realized by the CPU 11 executing corresponding programs.

Note that the flow shown in FIG. 7 is started when a user selects a sheet size on the page setting screen (FIG. 5) and the OS standard print control unit 103 acquires information on the selected sheet size. Note that the page setting screen in FIG. 5 includes a printer selection item (not shown) for selecting a printer. When a user selects a printer to be used on the page setting screen, it is determined whether to use the OS standard print function or the printer driver.

In S701, based on information about a sheet size selected by a user on a page setting screen, the OS standard print control unit 103 acquires, from the printer 110, information about a sheet feeding direction for sheet corresponding to the selected sheet size and information about the selected sheet size. For example, in a case where "double postcard" is selected by a user as the sheet size, an item "Double Postcard" in the list shown in FIG. 2 stored in the printer 110 is referred to, and the "long-edge" direction is acquired from the printer 110 as information indicating the direction of feeing sheet to the printer 110. Furthermore, information related to the sheet size is acquired from the printer 110 such that 14800 is acquired as information indicating the width of sheet and the 20000 is acquired as information indicating the height.

Note that when the information on the sheet feeding direction and the information on the sheet size are acquired from the printer, the acquired information may be stored in the PC 100. As for the information which has been already acquired from the printer and stored in the PC 100, it becomes possible to acquire not from the printer but from a memory in the PC 100. As a result, the number of processes of communicating with the printer is reduced, and thus the processing speed is increased. Note that the list of the sheet-related information shown in FIG. 2 may be acquired from the printer 110 and stored in a memory in the PC 100.

In S702, the OS standard print control unit 103 determines whether the sheet feeding direction acquired in S701 is the long-edge direction. For example, when the information on the sheet feeding direction to the printer 110 acquired from the printer 110 indicates "long-edge", it is determined that the sheet feeding direction is the long-edge direction. In a case where it is determined in S702 that the sheet feeding direction is the long-edge direction, the process proceeds to S703, but otherwise the process proceeds to S704.

In S703, the OS standard print control unit 103 performs a process of exchanging the width value and the height value acquired from the printer 110 in S701. For example, in a case where 14800 and 20000 are acquired respectively as the width and the height from the printer 110, the OS standard print control unit 103 exchanges the values of the width and the height so as to obtain 20000 and 14800 as new values of the width and the height. The resultant values obtained as a result of the exchange process are treated as the sheet size specified by the user. That is, in the subsequent process, the height and the width of the sheet size selected, before the flow shown in FIG. 7 is performed, by the user via the page setting screen shown in FIG. 5 are changed such that the height value acquired from the printer 110 is employed as the new value of the width, and the with value acquired from the printer 110 is employed as the new value of the height.

In S704, the OS standard print control unit 103 notifies the drawing application 101 of the height value and the width value of the sheet size as information related to the page setting, and ends the process. For example, in a case where the width and the height are changed in S703 to 20000 and 14800, respectively, these values are notified to the drawing application 101 as the information related to the sheet size. Together with the above-described information on the sheet size, information on the page orientation direction ("portrait" in the present embodiment) together with the information on the page orientation (the "portrait" orientation in the present example) may also be notified to the drawing application 101.

The drawing application 101 displays a page as a print area on the edit screen based on the height value and the width value notified from the OS standard print control unit 103. For example, in a case where a sheet size having a width of 20000 and a height of 14800 is notified from the OS standard print control unit 103, a landscape page corresponding to the notified size is displayed. That is, even in the case where a sheet size which is to be fed in the long-edge direction is selected as a result of the process in S703 under the environment of the OS standard print control unit 103, the default page orientation "portrait" is maintained without being changed and the landscape page is displayed on the edit screen as shown in FIG. 6C.

The process in S703 makes it possible for the OS standard print control unit 103 to display a landscape print preview. That is, in the same manner as when the printer driver shown in FIG. 3 is used, the landscape print preview can be displayed without changing the default page orientation on the print setting screen.

As described above, the present embodiment makes it possible for the drawing application to display the page on the edit screen, based on the sheet feeding direction corresponding to the sheet size selected by the user, such that the page is displayed in the same direction as the sheet feeding direction, and thus an improvement in the operability for the user is achieved. Thus, the user does not need to change the page orientation, which results in a further improvement in the operability.

Furthermore, in the present embodiment, also in the print preview on the print setting screen, the preview image is displayed in the same direction as the sheet feeding direction, which makes it possible to provide the more easily viewable preview image to the user.

Note that, the above description has been given by way of example for the case where "double postcard" is selected by a user, but the present embodiment is not limited to this example. For example, the embodiment may also be applied to a case where "envelope" is selected. That is, the present embodiment may be applied to any case where a selected sheet size is to be fed in the long-edge direction.

Note that, the above description has been given by way of example for the case where the sheet is fed in the "long-edge" direction, but the present embodiment is not limited to this example. For example, in a case where the OS standard print function has specifications in which all sheet sizes are registered as landscape sheet sizes, S703 and subsequent steps may be executed in a case where the sheet is to be fed in the "short-edge" direction.

Second Embodiment

Next, a second embodiment is described. In the first embodiment described above, when the sheet feeding direction for the sheet size selected by the user is the long-edge direction, the process is executed to exchange the width value and the height value of the sheet size selected by the user. In contrast, in the second embodiment, when the sheet feeding direction for the sheet size selected by the user is the long-edge direction, the OS standard print control unit 103 performs a process of changing the default setting of the page orientation from "portrait" to "landscape".

In the following description, the description common to the first embodiment is omitted, and only different points are described. In particular, a processing flow and the default setting of the print setting screen by the OS standard print control unit 103 are described below as points different from the first embodiment.

Figure 8:
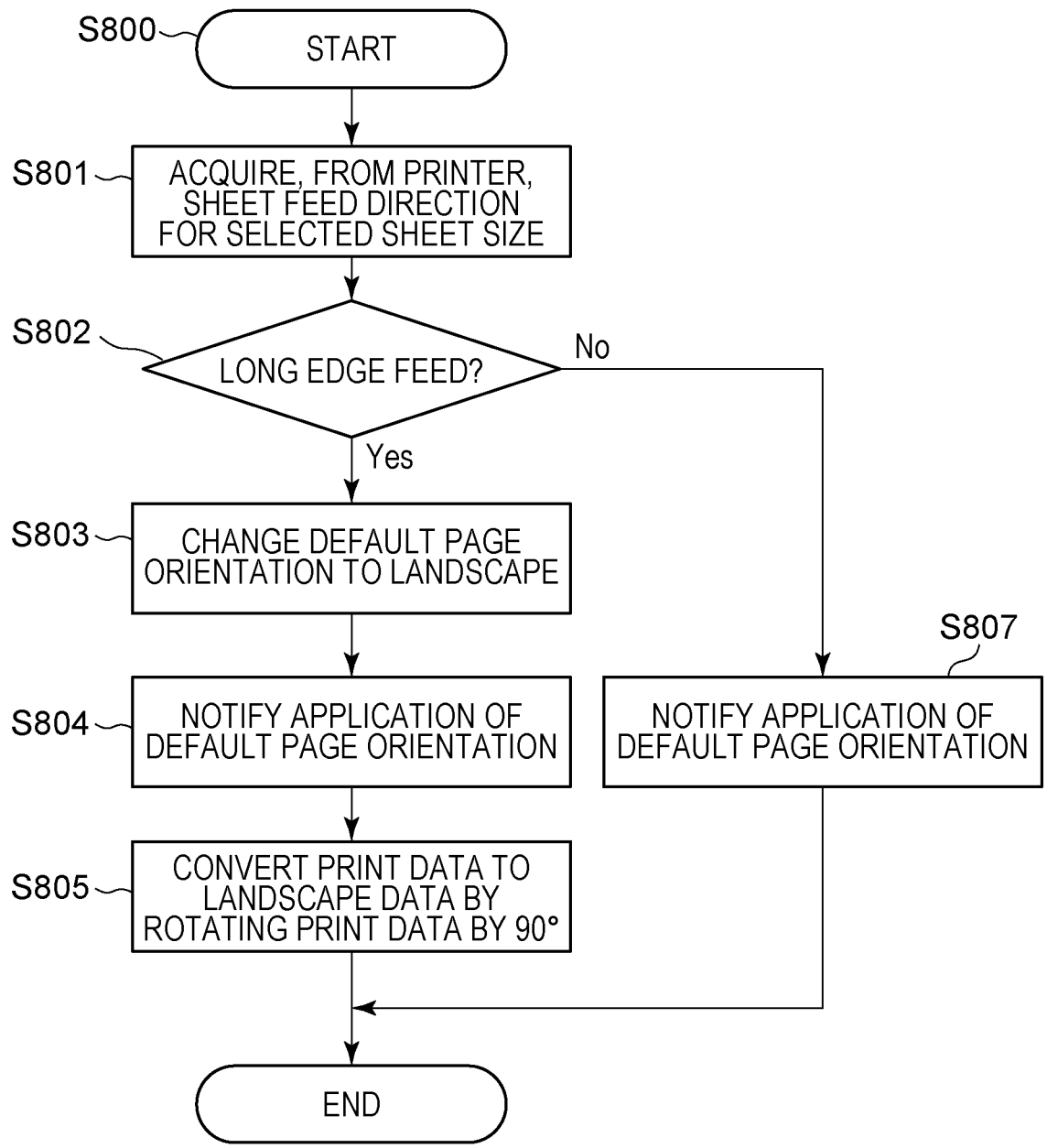
FIG. 8 is a flowchart illustrating a process of notifying an application of a sheet orientation in an OS standard print function.

FIG. 8 is a flowchart illustrating a process by the OS standard print control unit 103 to notify the drawing application 101 of the page orientation. In the following description, the OS standard print control unit 103 is a processing entity that performs various processes. However, in practice, functions corresponding to the respective processes are realized by the CPU 11 executing corresponding programs.

Note that the flow shown in FIG. 8 is started when a user selects a sheet size on the page setting screen (FIG. 5) and the OS standard print control unit 103 acquires information on the selected sheet size. Note that the page setting screen in FIG. 5 includes a printer selection item (not shown) for selecting a printer. When a user selects a printer to be used on the page setting screen, it is determined whether to use the OS standard print function or the printer driver. Processing steps in S800 to S802 in FIG. 8 are the same as those in S700 to S702 in FIG. 7 according to the first embodiment described above, and thus a further description thereof is omitted.

In S803, the OS standard print control unit 103 changes the default setting of the page orientation from "portrait" to "landscape". That is, in the present embodiment, in a case where it is determined in S802 that the sheet feeding direction to the printer 110 is the long-edge direction, the OS standard print control unit 103 performs, in S803, a process to set the default page orientation to "landscape".

In S804, the OS standard print control unit 103 notifies the drawing application 101 of the changed page orientation as information related to the page setting. For example, in a case where the page orientation is changed in S803 to landscape, landscape is notified to the drawing application 101 as information on the page orientation. When this notification is provided, information indicating the width value and the height value of the sheet may also be sent as information related to on the sheet size to the drawing application 101. For example, in a case where double postcard is selected by a user, information indicating that the width is 14800 and the height is 20000 may be sent as information on the sheet size to the drawing application 101.

The drawing application 101 displays a page as a print area on the edit screen based on the information on the page orientation notified in S804 from the OS standard print control unit 103. For example, in a case where information notified from the OS standard print control unit 103 indicates that the page orientation is landscape, a page is displayed in the landscape orientation according to the notified direction. This provides an improved operability in the edit operation to a user.

In S805, the OS standard print control unit 103 rotates the print data based on drawing data generated by the drawing application 101 by 90 degrees. This process is necessary because even if the default setting of the page orientation is changed in S803, the print data generated by the drawing application 101 still remains in the portrait orientation. Therefore, in S805, the OS standard print control unit 103 converts the print data into landscape print data by rotating the print data by 90 degrees such that printing is correctly performed when sheet is fed in the long-edge direction. After that, the process is ended.

In a case where the sheet feeding direction determined in S802 is different from the long-edge direction, the default setting of the orientation is not changed but is maintained in the portrait orientation. Then, in S807, information indicating that the page orientation is portrait is sent to the drawing application 101. In this case, since the print data generated by the drawing application 101 is in the portrait orientation, when the user presses the print button after performing the print settings, the OS standard print control unit 103 ends the process without rotating the print data by 90 degrees and thus the print data remains in the portrait orientation.

Figure 9:
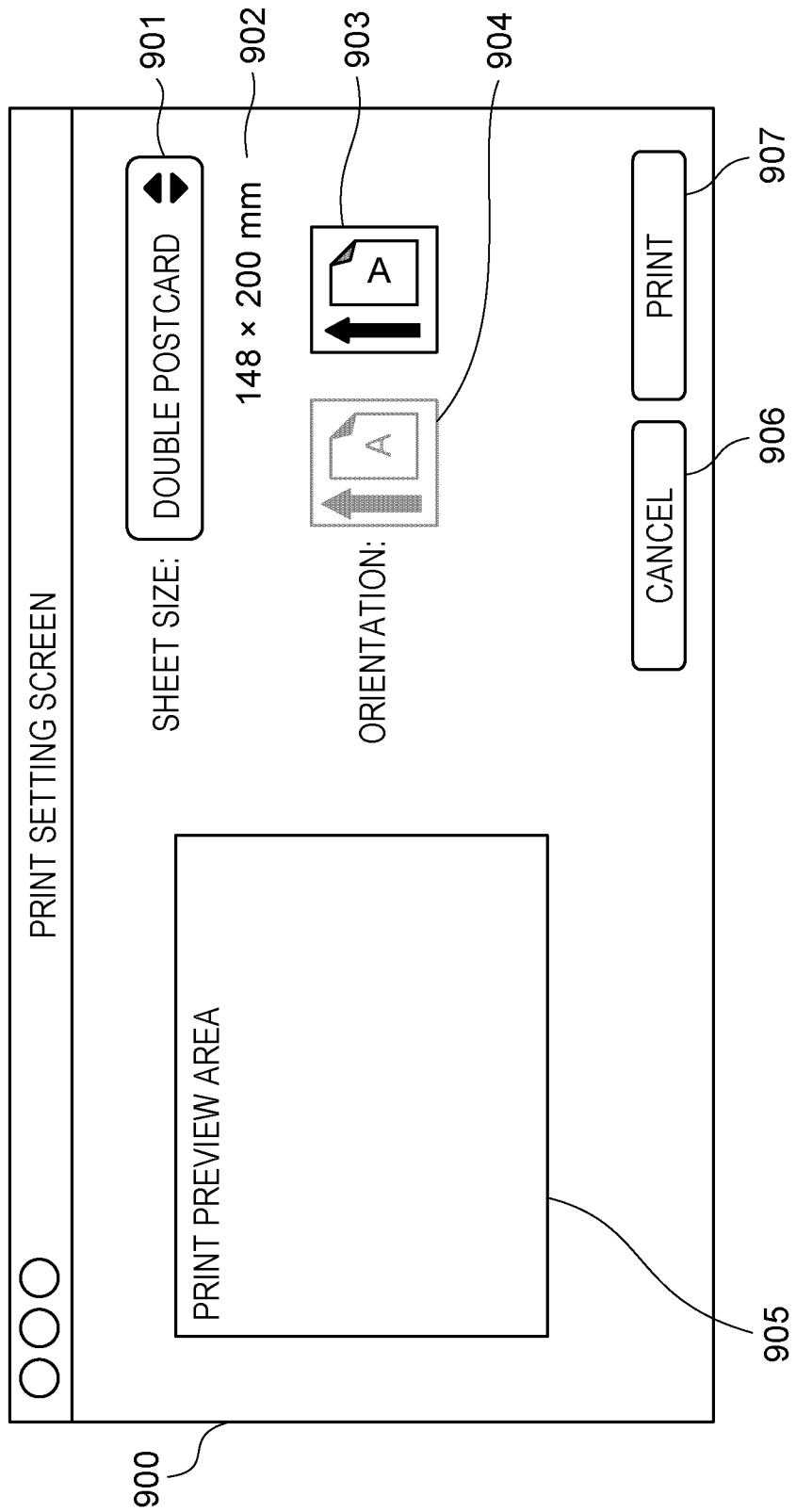
FIG. 9 is a diagram illustrating a sheet setting screen in a state where a default direction is changed when a sheet size is selected which is to be fed in a long-edge direction.

FIG. 9 is a schematic diagram illustrating a print setting screen 900 according to the present embodiment. The print setting screen 900 includes a sheet size selection item 901, a sheet size display area 902, and page orientation selection items including portrait 904 (a vertically long orientation) and landscape 903 (a horizontally long orientation). The print setting screen 900 further includes a print preview area 905, a cancel button 906, and a print button 907. Although not shown in FIG. 9, the print setting screen 900 also includes a printer selection item for selecting a printer to execute printing. In the example shown in FIG. 9, "double postcard" is selected as the sheet size which is to be fed in the long-edge direction, and accordingly the default setting of the page orientation is changed. In FIG. 9, a preview image in the print preview area 905 is also displayed in the landscape orientation. As described above, in S803, the OS standard print control unit 103 performs the process of changing the default page orientation from "portrait" to "landscape", so that the setting of the page direction is automatically changed to "landscape 903".

As described above, the present embodiment makes it possible for the drawing application to display the page on the edit screen, based on information on the sheet feeding direction corresponding to the sheet size selected by the user, such that the page is displayed in the same direction as the sheet feeding direction, and thus an improvement in the operability for the user is achieved. Thus, the user does not need to change the page setting, which results in a further improvement in the operability. Furthermore, in the present embodiment, also in the print preview on the print setting screen, the preview image is displayed in the same direction as the sheet feeding direction, which makes it possible to provide the more easily viewable preview image to the user. Furthermore, the OS standard print control unit 103 generates print data in the landscape direction based on the sheet feeding direction for the sheet size selected by the user such that printing is performed adaptively depending on the sheet which is to be fed in the long-edge direction.

Note that, the above description has been given by way of example for the case where "double postcard" is selected by a user, but the present embodiment is not limited to this example. For example, the embodiment may also be applied to a case where "envelope" is selected. That is, the present embodiment may be applied to any case where a selected sheet size is to be fed in the long-edge direction.

Note that, the above description has been given by way of example for the case where the sheet is fed in the "long-edge" direction, but the present embodiment is not limited to this example. For example, in a case where the OS standard print function has specifications in which all sheet sizes are registered as landscape sheet sizes, S803 and subsequent steps may be executed in a case where the sheet is to be fed in the "short-edge" direction.

Third Embodiment

Next, a third embodiment is described. In the third embodiment, if the sheet size selected by the user is sheet to be fed in the long-edge direction, the OS standard print control unit 103 displays information for guiding the user to set the page orientation and the sheet feeding direction.

In the following description, the description common to the first embodiment or the second embodiment is omitted, and only different points are described. In particular, a processing flow performed by the OS standard print control unit 103 and a process of displaying a guide message are described below as points different from the first and second embodiments.

Figure 10:
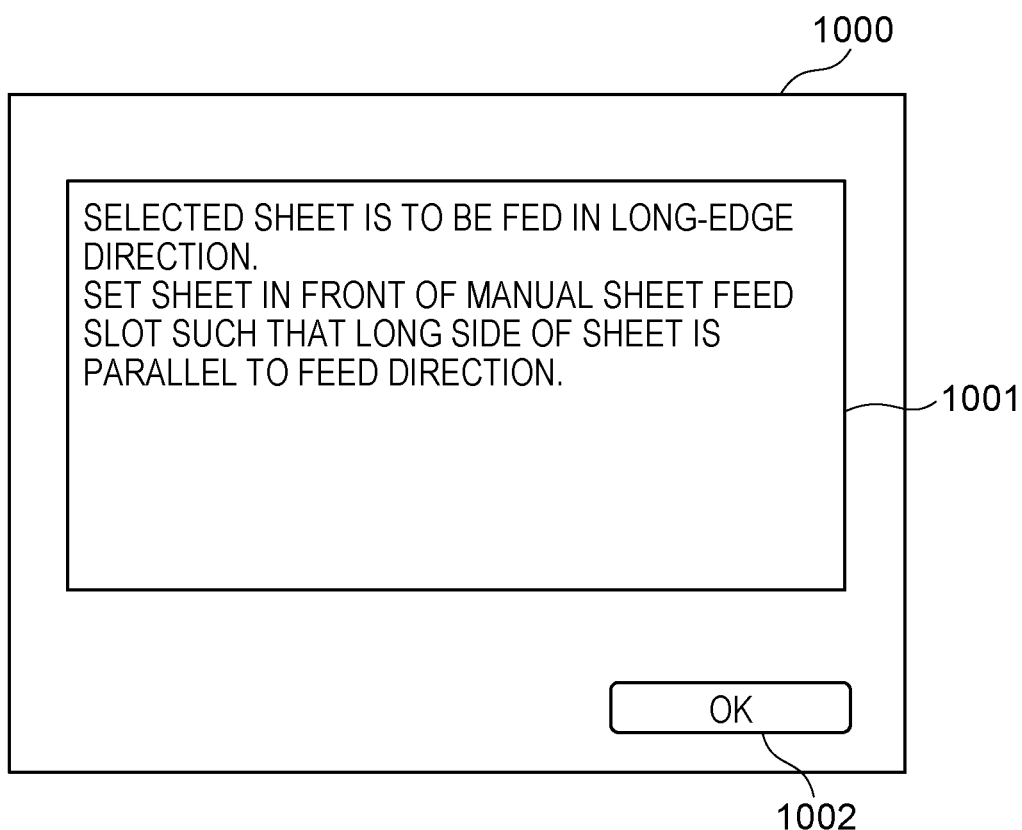
FIG. 10 a diagram illustrating a guide dialogue indicating a method of feeding sheet when sheet size is selected which is to be fed in a long-edge direction.

FIG. 10 is a schematic diagram showing a guide dialogue 1000 for guiding a sheet feeding method, which is displayed when a sheet size to be fed in the long-edge direction is selected. A guide area 1001 displays a guide message indicating that a sheet size which is to be fed to the printer 110 in the long-edge direction has been selected and that the sheet needs to be placed in front of a sheet feed slot of the printer 110 such that the sheet is fed in the long-edge direction. When the user presses an OK button 1002 on the guide dialog 1000, the OS standard print control unit 103 closes this dialog.

Figure 11:
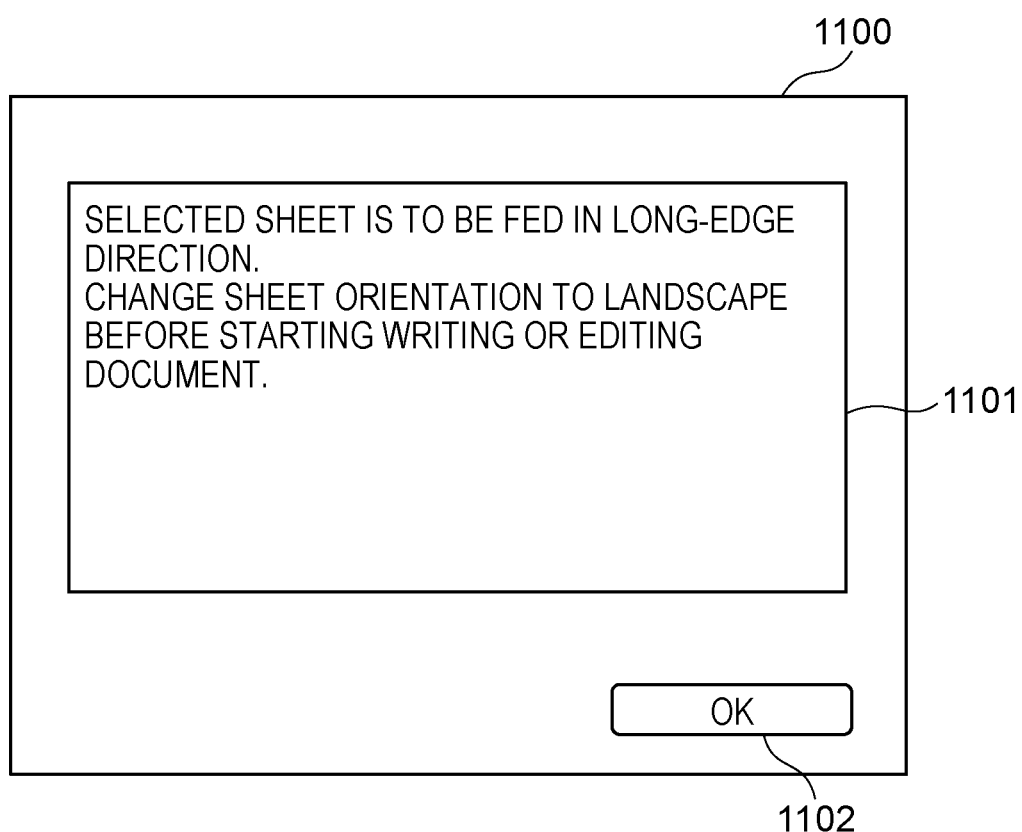
FIG. 11 a diagram illustrating a guide dialogue prompting to set a sheet orientation in a situation in which a sheet size is selected which is to be fed in a long-edge direction.

FIG. 11 is a schematic diagram showing a guide dialog 1100 for guiding the page orientation, which is displayed when a sheet size to be fed in the long-edge direction is selected. The guide area 1101 displays a guide message indicating that the sheet size to be fed to the printer 110 in the long-edge direction has been selected and that the page orientation needs to be set to landscape. When the user presses an OK button 1102 on the guide dialog 1100, the OS standard print control unit 103 closes this dialog.

Figure 12:
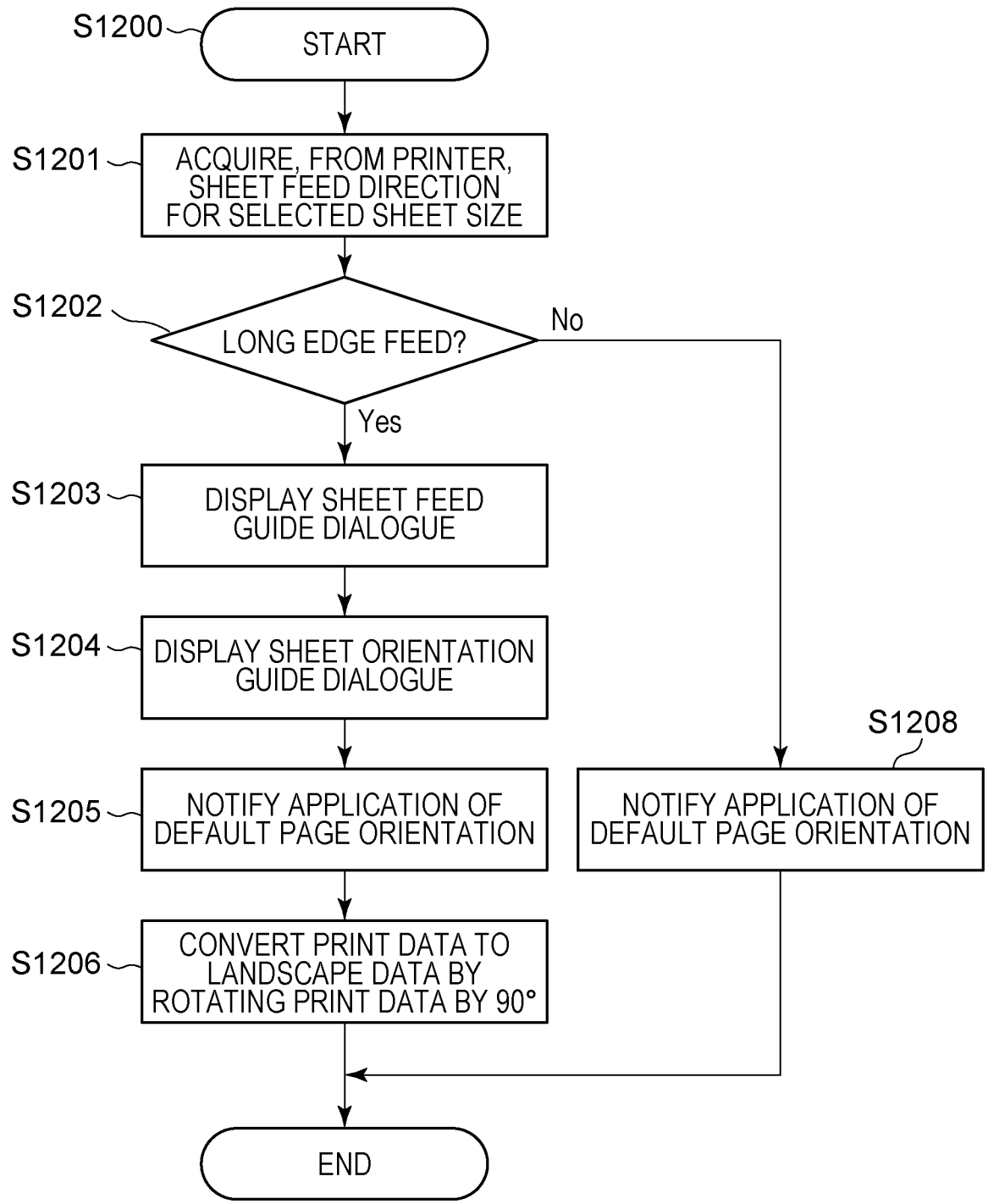
FIG. 12 is a flowchart illustrating a process of displaying a dialogue performed when a sheet size is selected which is displayed in a long-edge direction.

Next, a processing flow performed by the OS standard print control unit 103 according to the present embodiment is described. FIG. 12 is a flowchart showing a dialog display process performed by the OS standard print control unit 103. In the following description, the OS standard print control unit 103 is a processing entity that performs various processes. However, in practice, functions corresponding to the respective processes are realized by the CPU 11 executing corresponding programs.

Note that the flow shown in FIG. 12 is started when a user selects a sheet size on the page setting screen (FIG. 5) and the OS standard print control unit 103 acquires information on the selected sheet size. Note that the page setting screen in FIG. 5 includes a printer selection item (not shown) for selecting a printer. When a user selects a printer to be used on the page setting screen, it is determined whether to use the OS standard print function or the printer driver. Processes in S1200 to S1202 in FIG. 12 are the same as those in S700 to S702 in FIG. 7 according to the first embodiment described above, and thus a further description thereof is omitted.

In S1203, the OS standard print control unit 103 displays the guide dialog 1000. That is, in the present embodiment, in a case where the sheet feeding direction to the printer 110 indicates in S1202 the long-edge direction (in a direction along the long side of sheet), the OS standard print control unit 103 displays in S1203, the guide dialogue 1000 that guides the sheet feeding direction as shown in FIG. 10. When the user presses an OK button 1002 on the guide dialogue 1000, the OS standard print control unit 103 closes this dialog. Thereafter, the process proceeds to S1204.

In S1204, the OS standard print control unit 103 displays a guide dialogue 1100 that guides the user to set the page orientation as shown in FIG. 11. When the user presses an OK button 1102 in the guide dialogue 1100, the OS standard print control unit 103 closes the dialogue and proceeds to S1205. It is assumed that when the user views the guide dialogue 1100 in S1204, the user changes the page orientation from "portrait" to "landscape" on the page setting screen (FIG. 5).

Note that the contents of the guide dialogue 1000 for guiding the sheet feeding direction displayed in S1203 and the guide dialogue 1100 for guiding the setting of the page orientation displayed in S1204 may be combined together in one dialogue. Alternatively, S1203 may not be performed, and only S1204 may be performed. The guiding dialogue 1000 for guiding the sheet feeding method displayed in S1203 may also be displayed in S703 in the first embodiment or in S803 in the second embodiment.

In S1205, the OS standard print control unit 103 notifies the drawing application 101 of the set page orientation as information on the page setting. For example, when the user views the guide dialogue 1100 displayed in S1204, if the user changes the page orientation from "portrait" to "landscape", "landscape" is notified to the drawing application 101 as information on the page orientation. When this notification is provided, information indicating the width value and the height value of the sheet may also be sent as information on the sheet size to the drawing application 101. For example, in a case where double postcard is selected by a user, information indicating that the width is 14800 and the height is 20000 may be sent as information on the sheet size to the drawing application 101.

The drawing application 101 displays a page as a print area on the edit screen based on the information on the page orientation notified from the OS standard print control unit 103. For example, in a case where information notified from the OS standard print control unit 103 indicates that the page orientation is landscape, a page is displayed in the landscape orientation according to the notified direction. This provides an improved operability in the edit operation to a user.

In S206, the OS standard print control unit 103 rotates the print data based on drawing data generated by the drawing application 101 by 90 degrees. This process is necessary for the following reason. That is, when the views the guide dialogue 1100 displayed in S1204, even if the user sets the page orientation, the page orientation of the print data generated by the drawing application 101 still remains in the portrait orientation. Therefore, in S1206, the OS standard print control unit 103 converts the print data into landscape print data by rotating the print data by 90 degrees such that printing is correctly performed when sheet is fed in the long-edge direction. After that, the process is ended.

Thus, also in the present embodiment, since the page orientation is changed to landscape by the user when the user views the guide dialogue 1100 in displayed in S1204, a preview image is displayed in the print preview area 905 in the landscape orientation on the print setting screen as shown in FIG. 9.

Note that in a case where the sheet feeding direction determined in S1202 is different from the long-edge direction, the guide message is not provided to the user either in S1203 or S1204. Thereafter, in S1208, information indicating that the page orientation is the default orientation of portrait is sent to the drawing application 101. However, in the present embodiment, also in a case where the sheet feeding direction determined in S1202 is not the long-edge direction, a dialogue may be displayed to guide the user to set the sheet in front of the sheet feeding slot of the printer in the long-edge direction and set the page orientation to the portrait (default orientation). In this case, since the print data generated by the drawing application 101 is in the portrait orientation, when the user presses the print button after performing the print settings, the OS standard print control unit 103 ends the process without rotating the print data by 90 degrees and thus the print data remains in the portrait orientation.

As described above, in the present embodiment, based on information on the sheet feeding direction for the sheet size selected by the user, the guide message is displayed to prompt the user to set the page orientation. When the user vies this guide message, the user changes the page orientation to the long-edge direction. As a result, the drawing application is allowed to display the page on the edit screen in the same direction as the sheet feeding direction, and thus an improvement in operability is achieved. Furthermore, also in the print preview on the print setting screen, the preview image is displayed in the same direction as the sheet feeding direction, which makes it possible to provide the more easily viewable preview image to the user. Furthermore, the OS standard print control unit 103 generates print data in the landscape direction based on the sheet feeding direction for the sheet size selected by the user such that printing is performed adaptively depending on the sheet which is to be fed in the long-edge direction.

Note that, the above description has been given by way of example for the case where "double postcard" is selected by a user, but the present embodiment is not limited to this example. For example, the embodiment may also be applied to a case where "envelope" is selected. That is, the present embodiment may be applied to any case where a selected sheet size is to be fed in the long-edge direction.

Also note that, the above description has been given by way of example for the case where the sheet is fed in the "long-edge" direction, but the present embodiment is not limited to this example. For example, in a case where the OS standard print function has specifications in which all sheet sizes are registered as landscape sheet sizes, S1203 and subsequent steps may be executed in a case where the sheet is to be fed in the "short-edge" direction.

Fourth Embodiment

Next, a fourth embodiment is described. Depending on the sheet size, when sheet is fed to the printer in the long-edge direction, better operability is obtained when a page is displayed on the edit screen in a vertically long orientation than in the other orientation. For example, in some printers, in the case of a mode for performing high-speed printing, it is allowed to feed A4 size sheet in the long-edge direction. When printing is performed in such a high-speed print mode, A4 size drawing data is generated while displaying the page in the portrait orientation on the display screen. For example, in some printers, in the case of a mode for performing high-speed printing, it is allowed to feed A4 size sheet in the long-edge direction. When printing is performed in such a high-speed print mode, A4 size drawing data is generated while displaying the page in the portrait orientation on the display screen. Depending on the sheet size, when sheet is fed to the printer in the short-edge direction, better operability is obtained when a page is displayed on the edit screen in a horizontally long orientation than in the other orientation. For example, in the case of an envelope for an international mail, the user performs the editing operation on the edit screen on which the envelope is displayed in the landscape orientation, since the text is written in the horizontal direction even though the sheet is fed in the short-edge direction. Therefore, in the fourth embodiment, the OS standard print control unit 103 acquires information on the view direction for the sheet size selected by the user, and executes a process based on the information on the view direction.

In the following description, the description common to the first to third embodiments is omitted, and only different points are described. In particular, a processing flow performed by the OS standard print control unit 103 and sheet-related information acquired from the printer 110 are described below as points different from the first to third embodiment.

FIG. 13 is a diagram illustrating a list of sheet-related information including information on sheet sizes supported by the printer 110. It is assumed that this list of sheet-related information is stored in the printer 110. In the example shown in FIG. 13, it is assumed that three sheet sizes, that is, an A4 size, a double postcard size, and an envelope size are supported by the printer 110. The sheet-related information includes a sheet name 1301, a sheet width 1302, and a sheet height 1303 of each sheet size supported by the printer 110, and, in addition, the sheet-related information includes a sheet feeding direction 1304 and a sheet view direction 1305. In the present embodiment, it is determined in the specifications that only the envelope size is fed in the short-edge direction, and the A4 size and the double postcard are fed in the long-edge direction. It is also determined in the specifications that only A4 size is displayed on the edit screen in the short-edge direction, and the envelope size and the double postcard are displayed on the edit screen in the long-edge direction. As the sheet view direction 1305, short-edge is described for the sheet size which is displayed in a vertically long orientation, while long-edge is described for the sheet size which is displayed in a horizontally long orientation.

Figure 14:
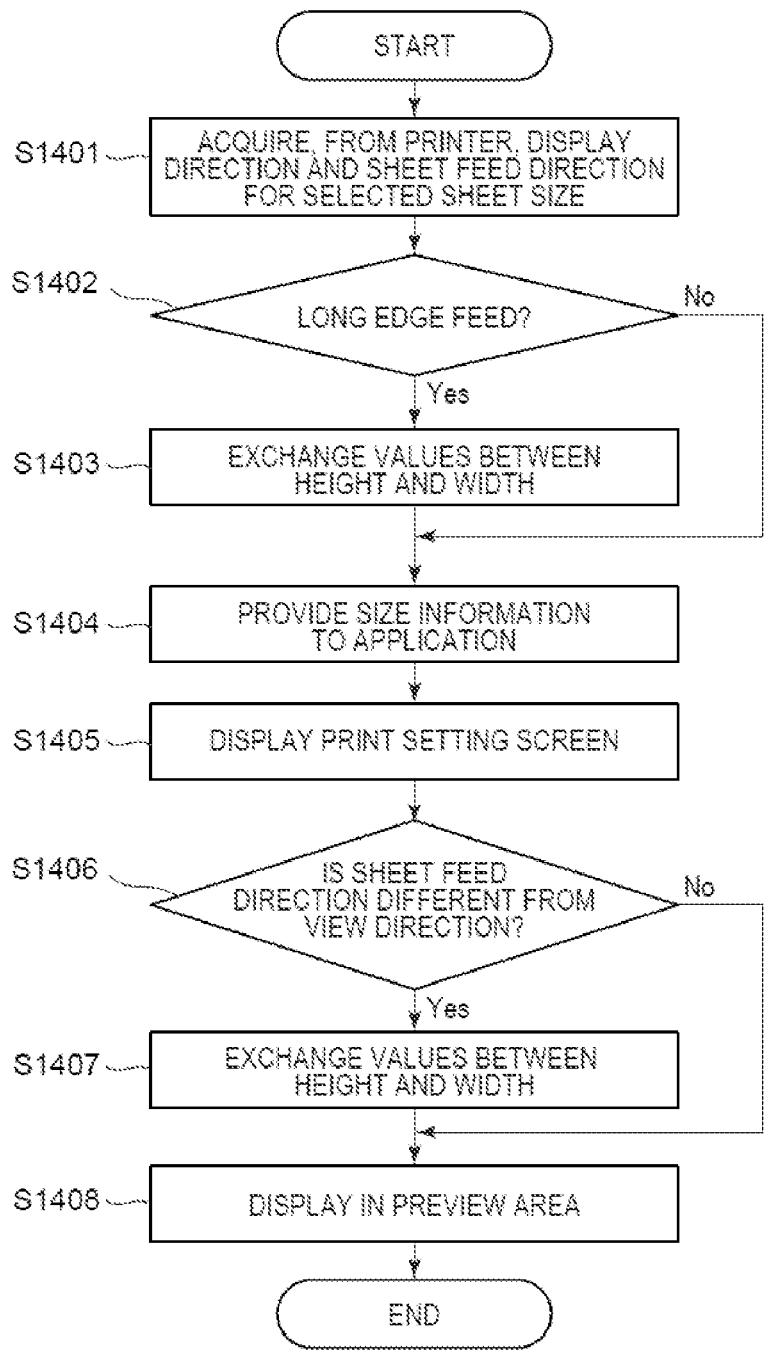
FIG. 14 is a flowchart illustrating a process of notifying an application of a sheet size using an OS standard print function based on a view direction.

FIG. 14 is a flowchart illustrating a process performed by the OS standard print control unit 103 to notify the drawing application 101 of the sheet size. In the following description, the OS standard print control unit 103 is a processing entity that performs various processes. However, in practice, functions corresponding to the respective processes are realized by the CPU 11 executing corresponding programs. Note that the flow shown in FIG. 14 is started when a user selects a sheet size on the page setting screen (FIG. 5) and the OS standard print control unit 103 acquires information on the selected sheet size.

In S1401, based on information on the sheet size selected by a user on a page setting screen, the OS standard print control unit 103 acquires information on a view direction for sheet corresponding to the selected sheet size, information on the sheet feeding direction, and information on the sheet size. For example, in a case where "double postcard" is selected by a user as the sheet size, an item "Envelope" in the list shown in FIG. 13 stored in the printer 110 is referred to, and the "long-edge" direction is acquired from the printer 110 as information on the view direction. Furthermore, as information on the sheet feeding direction, "short-edge" is acquired from the printer 110. Furthermore, information related to the sheet size is acquired from the printer 110 such that 9800 is acquired as information indicating the width of sheet and the 19000 is acquired as information indicating the height. Note that when the information on the view direction, the information on the sheet feeding direction, and the information on the sheet size are acquired from the printer, the acquired information may be stored in the PC 100. As for the information which has been already acquired from the printer and stored in the PC 100, it becomes possible to acquire not from the printer but from a memory in the PC 100. As a result, the number of processes of communicating with the printer is reduced, and thus the processing speed is increased. Note that the list of the sheet-related information shown in FIG. 13 may be acquired from the printer 110 and stored in a memory in the PC 100.

In S1402, the OS standard print control unit 103 determines whether the view direction acquired in S1401 is the long-edge direction. For example, when the information on the view direction acquired from the printer 110 indicates "long-edge", it is determined that the view direction is the long-edge direction. In a case where it is determined in S1402 that the view direction is the long-edge direction, the process proceeds to S1403, but otherwise the process proceeds to S1404.

In S1403, the OS standard print control unit 103 performs a process of exchanging the width value and the height value acquired from the printer 110 in S1401. For example, in a case where 9800 and 19000 are acquired respectively as the width and the height from the printer 110, the OS standard print control unit 103 exchanges the values of the width and the height so as to obtain 19000 and 9800 as new values of the width and the height. The resultant values obtained as a result of the exchange process are treated as the sheet size specified by the user. That is, in the subsequent process, the height and the width of the sheet size selected, before the flow shown in FIG. 14 is performed, by the user via the page setting screen shown in FIG. 5 are changed such that the height value acquired from the printer 110 is employed as the new value of the width, and the with value acquired from the printer 110 is employed as the new value of the height.

Figure 15:
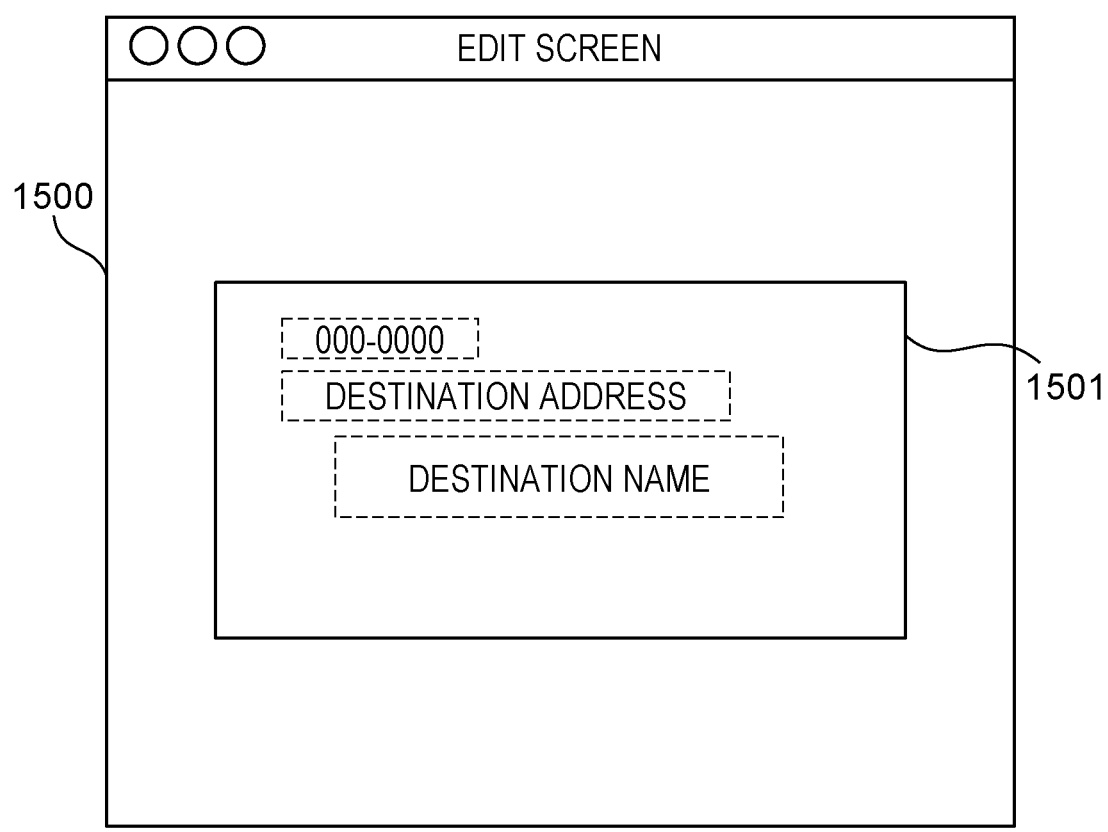
FIG. 15 is a diagram illustrating a document generation screen displayed when a sheet size is selected which is displayed in a long-edge direction.

In S1404, the OS standard print control unit 103 notifies the drawing application 101 of the height value and the width value of the sheet size as information on the page setting. For example, in a case where the width and the height are changed in S1403 to 19000 and 9800, respectively, these values are notified to the drawing application 101 as the information on the sheet size. Thus, the view direction of the print area in the edit screen displayed by the drawing application is determined depending on whether the view direction determined in S1402 is the long-edge direction or not. That is, in a case where it is notified that the width is 19000 and the height is 9800, the drawing application 101 displays a page in the long-edge direction on the edit screen (see FIG. 15). Note that in S1404, together with the above-described information on the sheet size, information on the page direction may also be notified to the drawing application 101.

Next, in S1405, the OS standard print control unit 103 starts a process of displaying the print setting screen according to an instruction received via the drawing application. Here, the OS standard print control unit 103 performs a process of determining the direction of the print preview area displayed on the print setting screen. The print preview area displayed in the print setting screen is basically determined based on the sheet feeding direction of each of sheet sizes supported by the printer 110 described in the sheet size information. That is, in a case where a process described below according to the present embodiment is not performed, the print preview is displayed in the long-edge direction when a sheet size which is to be fed in the long-edge direction is selected, but the print preview is displayed in the short-edge direction when a sheet size which is to be fed in the short-edge direction is selected.

In S1406, the OS standard print control unit 103 determines whether the view direction and the sheet feeding direction are different from each other. More specifically, in S1406, it is determined whether the view direction and the sheet feeding direction acquired in S1401 are different from each other. For example, in the case of the envelope size, the view direction is "long-edge" and the sheet feeding is "short-edge", and thus it is determined that the view direction and the sheet feeding direction are different from each other. In a case where it is determined in S1406 that the view direction and the sheet feeding direction are different from each other, the process proceeds to S1407, but otherwise the process proceeds to S1408.

In S1407, the OS standard print control unit 103 performs a process of exchanging the width value and the height value of the sheet size. For example, in a case where as a result of the process in S1403, the width and the height respectively become 19000 and 9800, these values are exchanged in S1407 such that the width becomes 9800 and the height becomes 19000. That is, the sheet size returns to the original one. Therefore, in a case where the view direction is the long-edge direction and the sheet feeding direction is the short-edge direction, the width of the print preview is finally equal to the width of the sheet size acquired from the printer 110, and the height of the print preview is finally equal to the height of the sheet size acquired from the printer 110. On the other hand, in a case where the view direction is the long-edge direction and the sheet feeding direction is the long-edge direction, the process in S1403 is not performed, and thus the print preview is displayed in the size obtained as a result of the process of exchanging the height and width of the sheet size acquired from the printer 110.

In S1408, the OS standard print control unit 103 displays the print preview based on the drawing data in the print preview area in accordance with the height and width set in S1407. After that, the process is ended. For example, in a case where the width is changed to 9800 and the height is changed to 19000 in S1407, the print preview in the displayed in the short-edge direction as shown in FIG. 16. Thus, the preview image is displayed in the same direction as the sheet feeding direction to the printer, which allows the user to put the sheet on the printer without being lost in the sheet feeding direction.

As described above, the present embodiment makes it possible for the drawing application to display the page on the edit screen according to the view direction defined for sheet corresponding to the sheet size selected by the user, and thus an improvement in the operability is achieved. Thus, the user does not need to change the page orientation, which results in a further improvement in the operability.

Furthermore, the print preview is displayed on the print setting screen in a direction corresponding to the sheet feeding direction defined for the sheet size selected by the user. This allows the user to put sheet on the printer in the same direction as the view direction of the print preview area. This results in a reduction in probability that the user puts the sheet in a wrong sheet feeding direction.

In the above example, the information on the view direction is included in the list of information related to sheet supported by the printer, but the present embodiment is not limited to this example. For example, since the view direction is determined according to a general use, the view direction may be stored in the OS standard print control unit 103 instead of being described in the information stored in the printer. In this case, in S1401 in FIG. 14, the OS standard print control unit 103 may acquire the view direction for the sheet corresponding to the sheet size selected by the user from a storage area of the OS standard print control unit 103.

Note that, the above description has been given by way of example for the case where "envelope" is selected by the user, but the present embodiment is not limited to this example. For example, the present embodiment may be applied to other sheet sizes such as "double postcard".

Fifth Embodiment

The printing system according to the first to fourth embodiments is configured such that a PC and a printer are connected by a specific bidirectional interface, but the configuration is not limited to this example. For example, the printing system may be configured such that a PC and a printer are integrated in a single apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A function of each embodiment may also be realized by an OS or the like running on a computer by performing part or all of actual processes according to an instruction of a program.

According to the present disclosure, an improvement in operability can be achieved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068052, filed Mar. 29, 2019, which is hereby incorporated by reference here in its entirety.

What is claimed is:

1. A method of controlling an information processing apparatus, the method comprising:
   acquiring information on a sheet size specified by a user;
   acquiring information on a sheet feeding direction from a printing apparatus for a sheet corresponding to the specified sheet size;
   executing, in a case where the sheet feeding direction is a predetermined direction, a predetermined control; and
   notifying information on a page setting to a drawing application after the predetermined control is executed,
   wherein, in executing the predetermined control in a case where the sheet feeding direction is a long-edge direction, a guiding message prompting the user to set a page orientation to a landscape orientation is displayed on a display unit, and
   wherein, in a case where the page setting is performed such that the page orientation is set to the landscape orientation by the user after the guiding message is displayed, notifying the drawing application includes issuing a notification that the page orientation is set to the landscape orientation.

2. The method according to claim 1,
   wherein the predetermined control is executed in the case where the sheet feeding direction is the long-edge direction, and
   wherein, based on the notification that the page orientation is set to the landscape orientation, the drawing application displays on the display unit an edit screen including a landscape page.

3. The method according to claim 1, further comprising generating print data based on drawing data generated by the drawing application,
   wherein, in a case where the page orientation is set to a landscape direction, generating the print data includes generating print data in landscape orientation by a rotation process.

4. The method according to claim 1, wherein acquiring the information on the sheet feeding direction includes acquiring, from the printing apparatus, information on the sheet feeding direction and values of a width and a height of sheet corresponding to the specified sheet size.

5. The method according to claim 1,
   wherein, for a sheet corresponding to each of a plurality of sheet sizes, the printing apparatus stores information on the plurality of sheet sizes and information on a sheet feeding direction, and
   wherein, in each of the plurality of sheet sizes, a height value is equal to or greater than a width value.

6. The method according to claim 1, further comprising controlling, by a user instruction, to display a print setting screen on the display unit.

7. The method according to claim 1, wherein Internet Printing Protocol (IPP) is used for communication with the printing apparatus.

8. An information processing apparatus comprising:
   at least one processor configured to control:
   a first acquisition unit configured to acquire information on a sheet size specified by a user,
   a second acquisition unit configured to acquire information on a sheet feeding direction from a printing apparatus for a sheet corresponding to the specified sheet size,
   a control unit configured to execute, in a case where the sheet feeding direction is a predetermined direction, a predetermined control, and
   a notification unit configured to notify information on a page setting to a drawing application after the predetermined control is executed,
   wherein, in executing the predetermined control in a case where the sheet feeding direction is a long-edge direction, the control unit causes a display unit to display a guiding message prompting the user to set a page orientation to a landscape orientation, and
   wherein, in a case where the page setting is performed such that the page orientation is set to the landscape orientation by the user after the guiding message is displayed, the notification unit issues a notification that the page orientation is set to the landscape orientation.

9. The information processing apparatus according to claim 8,
   wherein the predetermined control is executed in the case where the sheet feeding direction is the long-edge direction, and
   wherein, based on the notification that the page orientation is set to the landscape orientation, the drawing application displays on the display unit an edit screen including a landscape page.

10. The information processing apparatus according to claim 8,
    wherein the at least one processor is further configured to control a generating unit configured to generate print data based on drawing data generated by the drawing application, and
    wherein, in a case where the page orientation is set to a landscape direction, the generating unit generates the print data in landscape orientation by a rotation process.

11. The information processing apparatus according to claim 8, wherein the second acquisition unit acquires, from the printing apparatus, information on the sheet feeding direction and values of a width and a height of sheet corresponding to the specified sheet size.

12. The information processing apparatus according to claim 8,
wherein, for a sheet corresponding to each of a plurality of sheet sizes, the printing apparatus stores information on the plurality of sheet sizes and information on a sheet feeding direction, and
wherein, in each of the plurality of sheet sizes, a height value is equal to or greater than a width value.

13. The information processing apparatus according to claim 8, wherein the at least one processor is further configured to control a display controlling unit that is configured to control, by a user instruction, to display a print setting screen on the display unit.

14. The information processing apparatus according to claim 8, wherein Internet Printing Protocol (IPP) is used for communication with the printing apparatus.

15. An information processing apparatus comprising:
at least one processor configured to control:
a first acquisition unit configured to acquire information on a sheet size specified by a user,
a second acquisition unit configured to acquire information on a sheet feeding direction from a printing apparatus for a sheet corresponding to the specified sheet size,
a control unit configured to execute, in a case where the sheet feeding direction is a predetermined direction, a predetermined control,
a notification unit configured to notify information on a page setting to a drawing application after the predetermined control is executed, and
a display controlling unit configured to control, by a user instruction, to display a print setting screen on a display unit,
wherein, for a sheet corresponding to each of a plurality of sheet sizes, the printing apparatus stores information on the plurality of sheet sizes, information on a sheet feeding direction, and information on a view direction relative to a sheet edge for each corresponding sheet,
wherein the second acquisition unit acquires, from the printing apparatus, the information on the sheet feeding direction for the corresponding sheet, values of a width and a height of the sheet corresponding to the specified sheet size, and information on the view direction,
wherein, in a case where the view direction is a long-edge direction, the control unit performs a process to exchange the width value for the height value and exchange the height value for the width value,
wherein the notification unit issues a notification about the exchanged value of the width and the exchanged value of the height as information on a sheet size included in the information on the page setting,
wherein, based on the notification about the exchanged value of the width and the exchanged value of the height, the drawing application displays on the display unit an edit screen including a landscape page, and
wherein, in a case where the sheet feeding direction and the view direction are different from each other, the control unit displays on the print setting screen in the long-edge direction a preview image based on drawing data generated by the drawing application.

16. The information processing apparatus according to claim 15, wherein the predetermined control is executed in a case where the sheet feeding direction is the long-edge direction.

17. The information processing apparatus according to claim 15,
wherein the at least one processor is further configured to control a generating unit configured to generate print data based on the drawing data generated by the drawing application, and
wherein, in a case where page orientation is set to a landscape direction, the generating unit generates the print data in landscape orientation by a rotation process.

18. The information processing apparatus according to claim 15, wherein, in each of the plurality of sheet sizes, a height value is equal to or greater than a width value.

19. The information processing apparatus according to claim 15, wherein Internet Printing Protocol (IPP) is used for communication with the printing apparatus.

* * * * *